United States Patent
Fujimoto et al.

(10) Patent No.: US 7,903,874 B2
(45) Date of Patent: Mar. 8, 2011

(54) RULED-LINE-PROJECTION EXTRACTING APPARATUS, RULED-LINE PROJECTION EXTRACTING METHOD, AND COMPUTER PRODUCT

(75) Inventors: Katsuhito Fujimoto, Kawasaki (JP); Misako Suwa, Kawasaki (JP); Hiroaki Takebe, Kawasaki (JP); Satoshi Naoi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 851 days.

(21) Appl. No.: 11/894,188

(22) Filed: Aug. 20, 2007

(65) Prior Publication Data

US 2008/0112619 A1    May 15, 2008

(51) Int. Cl.
   *G06K 9/34* (2006.01)
(52) U.S. Cl. ...................................................... 382/174
(58) Field of Classification Search .................. 382/254, 382/174, 275, 285, 286; 358/496, 498; 355/47, 355/407, 408
   See application file for complete search history.

(56) References Cited

U.S. PATENT DOCUMENTS

| | | | |
|---|---|---|---|
| 7,471,848 B2 * | 12/2008 | Fujimoto et al. | 382/275 |
| 2002/0044681 A1 * | 4/2002 | Fujimoto et al. | 382/154 |

FOREIGN PATENT DOCUMENTS

| | | |
|---|---|---|
| JP | 2002-150280 | 5/2002 |
| JP | WP 2005/041125 | 5/2005 |

\* cited by examiner

*Primary Examiner* — Jose L Couso
(74) *Attorney, Agent, or Firm* — Greer, Burns & Crain, Ltd.

(57) ABSTRACT

A set of straight lines that associate a top parallel geodesic projection positioned at an upper end with a bottom parallel geodesic projection positioned at a lower end, among sets of parallel geodesic projections, is extracted as a set of ruled-line candidate projections as a search target of a set of ruled line projections. A deviation of neighborhood, which is a distance between a cross ratio vector of the ruled-line candidate projection and a cross ratio vector of a neighboring line obtained by shifting the ruled-line candidate projection by a predetermined interval, is calculated for each ruled-line candidate projection. A set of straight lines having the smallest sum total of deviations of neighborhood, in the set of straight lines, which do not intersect with each other, among the sets of ruled-line projection candidates is extracted as a set of ruled line projections by continuous dynamic programming.

6 Claims, 22 Drawing Sheets

(b) RULED LINES
(STRAIGHT LINE PASSING $x^U(S)$ AND $x^D(S)$)
TOP PARALLEL GEODESIC PROJECTION
$s=0$, $t=0$, $x^U(s)$
$s=1$ $x^U(s) = (x^U(s), y^U(s), z^U(s))$
$t=t_1$
INNER PARALLEL GEODESIC PROJECTIONS
$t=t_2$
$x^i(s) = (x^i(s), y^i(s), z^i(s))$
$(i=1,2...)$
$t=1$
BOTTOM PARALLEL GEODESIC PROJECTION
$x^D(s)$ $x^D(s) = (x^D(s), y^D(s), z^D(s))$ (c) CENTER OF CAMERA
$x^c = (x^c, y^c, z^c)$
$h^a$
POINT CONSTITUTING PARALLEL GEODESIC LINE ON 3D PAPER CURVED SURFACE
$x^a = (x^a, y^a, z^a)$
$1 - h^a$
POINT CONSTITUTING PARALLEL GEODESIC PROJECTION ON SCREEN
$X^a = (X^a, Y^a, 0)$ (d) $$x^a = h^a X^a + (1 - h^a) x^c$$

FIG.3B

| (c) | $\mathrm{T}(s) = \left(T^1(s), T^2(s), \cdots, T^N(s)\right)$ |
|---|---|
| (d) | $\mathrm{U}(s) = \left(U^1(s), U^2(s) \cdots U^N(s)\right) = k\left(\dfrac{1}{T^1(s)} - 1, \dfrac{1}{T^2(s)} - 1, \ldots, \dfrac{1}{T^N(s)} - 1\right)$ |
| (e) | $\mathrm{E} = \dfrac{1}{N_S} \sum_S \left\| U(s) - \overline{U} \right\|^2$ |

| | TANGENT VECTOR $\dot{x}^U(s)$ OF $x^U(s)$ AND TANGENT VECTOR $\dot{x}^D(s)$ OF $x^D(s)$ ARE PARALLEL |
|---|---|
| (a) | $\begin{pmatrix} \dot{X}^U - \dot{X}^D \\ \dot{Y}^U - \dot{Y}^D \end{pmatrix} \begin{pmatrix} h^U / \dot{h}^U \\ h^D / \dot{h}^D \end{pmatrix} = \begin{pmatrix} X^D - X^U \\ Y^D - Y^U \end{pmatrix}$ |
| (b) | $f^a(s) = \dot{h}^a(s) / h^a(s) \quad (a = U, D)$ |
| (c) | $h^a(s) = A^a \exp\left(\int f^a(s) ds\right)$ |

RULED-LINE-PROJECTION EXTRACTING APPARATUS, RULED-LINE PROJECTION EXTRACTING METHOD, AND COMPUTER PRODUCT

BACKGROUND OF THE INVENTION

1. Field of the Invention

The present invention relates to a technology for extracting ruled-line projection.

2. Description of the Related Art

Conventionally, in the financial industry, such as banks, a technique for inputting paper forms and paper documents at a high speed by a non-contact imaging device such as a charge coupled device (CCD) or a digital camera has been put to practical use to perform input operations efficiently. However, in an image input by the non-contact imaging device, there are various image distortions resulting from curvature of the paper (for example, see FIGS. 19 to 23 of Japanese Patent Application Laid-open No. 2002-150280).

For example, the present applicant has disclosed a technique for estimating a three-dimensional curved surface of paper face (hereinafter, "three-dimensional paper curved surface") based on a distortion of a two-dimensional profile of the paper extracted from an image to correct the image distortion in Japanese Patent Application Laid-open No. 2002-150280.

In the conventional technique, the type of distortion to be corrected is limited, so that the type needs to be specified. Moreover, when an entire sheet of paper is not imaged in the captured image, the profile thereof cannot be extracted, and therefore applicable images are limited.

There is known a method for creating an image where image distortion is corrected by extracting a set of parallel geodesic projections from a focused image of the three-dimensional paper curved surface, to extract a set of ruled line projections by using such a property that paper is a ruled surface, estimating the three-dimensional paper curved surface from the set of parallel geodesic projections and the set of ruled line projections, and determining a pixel-to-pixel correspondence between the estimated three-dimensional paper curved surface and the focused image, as disclosed in "Image distortion-correcting program, image-distortion correcting apparatus, image distortion-correcting method, and recording medium storing image distortion-correcting program" (Japanese Patent No. 2005-514903), which is a prior invention of the present applicant.

In the above method, however, combinations of sets of ruled-line candidate projections searched for on the focused image are huge, and a huge calculation amount is required for calculating a sum total of the "deviation" for all cases. For example, even if the calculation amount is reduced by using a steepest descent method, which is a sequential search method, the set of ruled-line candidate projections that gives a local optimum value is extracted as the set of ruled line projections, depending on an initial value to be set. Accordingly, a highly accurate and stable set of ruled line projections cannot be extracted.

Further, according to the above method, the sum total of "deviation" can be calculated only for the ruled-line candidate projections, which intersect all of the sets of the extracted parallel geodesic projections, and "deviation" of the ruled-line candidate projections, which do not intersect all of the parallel geodesic projections, are excluded from the search target as the ruled line projection. Therefore, for example, there is a possibility that the sets of the ruled line projections are extracted mainly in a central partial set of parallel geodesic projections on the image. Accordingly, there is a problem in that the paper distortion cannot be corrected highly accurately and stably, since the set of ruled line projections cannot be extracted highly accurately and stably.

SUMMARY OF THE INVENTION

It is an object of the present invention to at least partially solve the problems in the conventional technology.

According to an aspect of the present invention, a computer-readable recording medium stores therein a computer program that causes a computer to execute extracting a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the rules line projections in which ruled lines, which are straight lines forming the three-dimensional paper curved surface, are projected on the image, respectively, by the set of parallel geodesic projections is constant. Specifically, the computer program causing the computer to execute first extracting including extracting a set of straight lines that associate a top parallel geodesic projection positioned at an upper end with a bottom parallel geodesic projection positioned at a lower end, among the sets of parallel geodesic projections as a set of ruled-line candidate projections as a search target of a set of ruled line projections; calculating a deviation of neighborhood, which is a distance between a vector determined based on an interior division ratio of the ruled-line candidate projection extracted at the first extracting and a vector determined based on an interior division ratio of a neighboring line obtained by shifting the ruled-line candidate projection by a predetermined interval, for each of the ruled-line candidate projections; storing and holding the deviation of neighborhood calculated at the calculating for each ruled-line candidate projection; and second extracting including extracting a set of straight lines having the smallest sum total of the deviations of neighborhood held at the storing and holding as a set of ruled line projections, in the sets of straight lines that do not intersect with each other among the sets of ruled-line candidate projections, according to continuous dynamic programming.

According to another aspect of the present invention, a computer-readable recording medium stores therein a computer program that causes a computer to execute extracting a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the rules line projections in which ruled lines, which are straight lines forming the three-dimensional paper curved surface, are projected on the image, respectively, by the set of parallel geodesic projections is constant. Specifically, the computer program causing the computer to execute first extracting including extracting a set of straight lines that associate a top parallel geodesic projection positioned at an upper end with a bottom parallel geodesic projection positioned at a lower end, among the sets of parallel geodesic projections, as a set of ruled-line candidate projections as a search target of a set of ruled line projections; first calculating including calculating a ruled-line-candidate projection vector, which is a vector determined based on an interior division ratio of the ruled-line candidate projections extracted at the first extracting, for each ruled-line candidate projection; storing and holding the ruled-line-candidate projection vector calculated at the first calculating for each ruled-line candidate projection; second calculating including calculating a deviation, which is a distance between the ruled-line-candidate projection vector held at the storing and holding and a selected average vector, which is an average of the vectors determined based on the interior division ratio of the respective ruled-line candidate projections in a set of selected ruled-line projections optionally selected as the set of ruled line projections, for each ruled-line candidate projection; second extracting including extracting a set of straight lines having the smallest sum total of the deviations calculated at the second calculating as a new set of selected ruled-line projections, in the sets of straight lines that do not intersect with each other among the sets of ruled-line candidate projections, according to continuous dynamic programming; and third extracting including extracting the set of selected ruled-line projections when a decrease of sum total of the deviations is settled, as the set of ruled line projections, by repeatedly executing a process at the second calculating, using the ruled-line-candidate projection vector held at the storing and holding and the set of selected ruled-line projections newly extracted at the second extracting, and a process at the second extracting.

According to still another aspect of the present invention, a computer-readable recording medium stores therein a computer program that causes a computer to execute extracting a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the rules line projections in which ruled lines, which are straight lines forming the three-dimensional paper curved surface, are projected on the image, respectively, by the set of parallel geodesic projections is constant. Specifically, the computer program causing the computer to execute limiting the three-dimensional paper curved surface to a curved surface by a generalized conic model, which is a low order category of the ruled surface, using a condition that in an image obtained by imaging the curved surface by the generalized conic model, all ruled line projections intersect with each other at one vanishing point, and extracting a set of ruled line projections by checking a set of straight lines radially extended toward the set of parallel geodesic projections for each candidate of vanishing point, which is an optionally set candidate of vanishing point.

According to still another aspect of the present invention, a computer-readable recording medium stores therein a computer program that causes a computer to execute extracting a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the rules line projections in which ruled lines, which are straight lines forming the three-dimensional paper curved surface, are projected on the image, respectively, by the set of parallel geodesic projections is constant. Specifically, the computer program causing the computer to execute estimating a minimum value of deviation, which is a distance between an imperfect vector determined based on an interior division ratio between imperfect ruled-line candidate projections and a partial set of parallel geodesic projections, and an average perfect vector, which is an average of perfect vectors determined based on the interior division ratio between respective subsets of ruled-line candidate projections and all the set of parallel geodesic projections, relative to all the imperfect ruled-line candidate projections for each imperfect set of ruled-line candidate projections, with regard to imperfect sets of ruled-line candidate projections including a subset of perfect ruled-line candidate projections that intersect with all the set of parallel geodesic projections and a subset of imperfect ruled-line candidate projections that intersect with only a partial set of parallel geodesic projections among the set of ruled-line candidate projections, which is a search target of the set of ruled line projections; calculating sum total of deviations of the imperfect set of ruled-line candidate projections by assuming the minimum value of deviation estimated at the estimating as a deviation, which is a distance between the imperfect vector of imperfect ruled-line candidate projections and the average perfect vector, and adding the estimated deviation to a deviation, which is a distance between the perfect vector and the average perfect vector; and extracting a set of ruled-line candidate projections having the smallest sum total of deviations as the set of ruled line projections, by comparing the sum total of deviations of the imperfect set of ruled-line candidate projections calculated at the calculating with the sum total of deviations between the perfect vectors calculated from respective perfect sets of ruled-line candidate projections including only the perfect ruled-line candidate projections and the average perfect vector.

According to still another aspect of the present invention, a ruled-line-projection extracting apparatus that extracts a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the rules line projections in which ruled lines, which are straight lines forming the three-dimensional paper curved surface, are projected on the image, respectively, by the set of parallel geodesic projections is constant, includes a first extracting unit that extracts a set of straight lines that associate a top parallel geodesic projection positioned at an upper end with a bottom parallel geodesic projection positioned at a lower end, among the sets of parallel geodesic projections, as a set of ruled-line candidate projections as a search target of a set of ruled line projections; a calculating unit that calculates a deviation of neighborhood, which is a distance between a vector determined based on an interior division ratio of the ruled-line candidate projection extracted by the first extracting unit and a vector determined based on an interior division ratio of a neighboring line obtained by shifting the ruled-line candidate projection by a predetermined interval, for each of the ruled-line candidate projections; a storing-and-holding unit that stores and holds the deviation of neighborhood calculated by the calculating unit for each ruled-line candidate projection; and a second extracting unit that extracts a set of straight lines having the smallest sum total of the deviations of neighborhood held by the storing-and-holding unit as a set of ruled line projections, in the sets of straight lines that do not intersect with each other among the sets of ruled-line candidate projections, according to continuous dynamic programming.

According to still another aspect of the present invention, a method of extracting a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the rules line projections in which ruled lines, which are straight lines forming the three-dimensional paper curved surface, are projected on the image, respectively, by the set of parallel geodesic projections is constant, includes first extracting including extracting a set of straight lines that associate a top parallel geodesic projection positioned at an upper end with a bottom parallel geodesic projection positioned at a lower end, among the sets of parallel geodesic projections, as a set of ruled-line candidate projections as a search target of a set of ruled line projections; calculating a deviation of neighborhood, which is a distance between a vector determined based on an interior division ratio of the ruled-line candidate projection extracted at the first extracting and a vector determined based on an interior division ratio of a neighboring line obtained by shifting the ruled-line candidate projection by a predetermined interval, for each of the ruled-line candidate projections; storing and holding the deviation of neighborhood calculated at the calculating for each ruled-line candidate projection; and second extracting including extracting a set of straight lines having the smallest sum total of the deviations of neighborhood held at the storing and holding as a set of ruled line projections, in the sets of straight lines that do not intersect with each other among the sets of ruled-line candidate projections, according to continuous dynamic programming.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a schematic for explaining modeling of a three-dimensional paper curved surface and a focused image;

FIG. 3B is another schematic for explaining a property and an extraction condition of the ruled line projections;

DETAILED DESCRIPTION OF THE PREFERRED EMBODIMENTS

Figure 2:
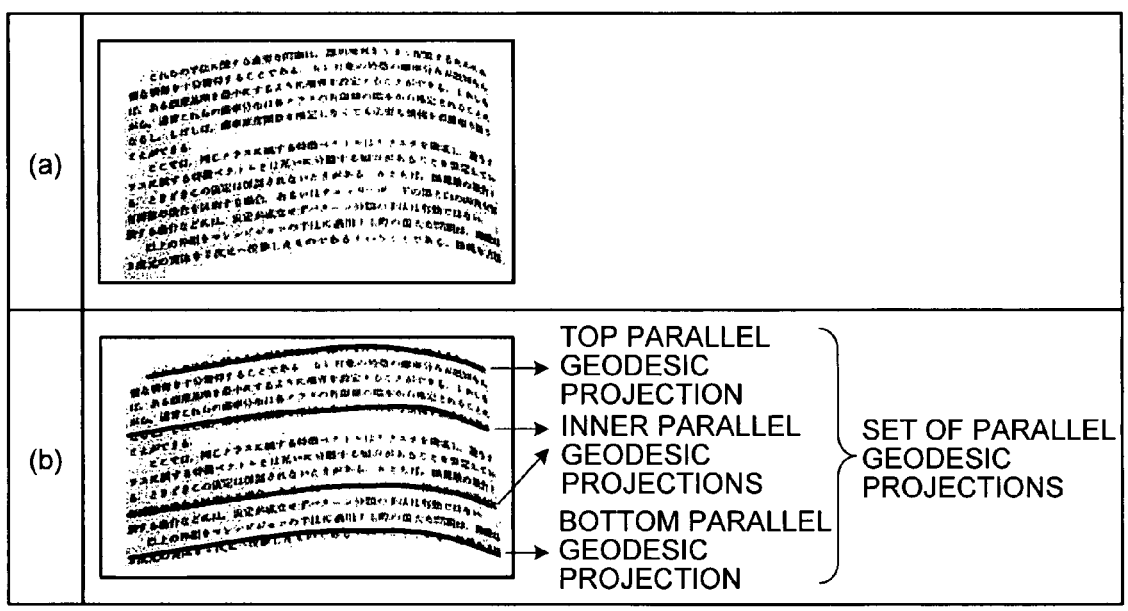
FIG. 2 is a schematic for explaining a set of extracted parallel geodesic projections.

Exemplary embodiments of the present invention will be explained below in detail with reference to the accompanying drawings. One example of a ruled-line-projection extracting apparatus that includes a ruled-line-projection extraction program is explained as an embodiment of the present invention. A configuration and process procedures of a ruled-line-projection extracting apparatus according to a first embodiment of the present invention, and effects of the first embodiment are sequentially explained. A ruled-line-projection extracting apparatus according to a second, third, fourth, and fifth embodiments are sequentially explained after the explanations of the first embodiment, in the same order of those in the first embodiment.

An example of an image-distortion correcting apparatus including the ruled-line-projection extracting apparatus is explained first. The image-distortion correcting apparatus including the ruled-line-projection extracting apparatus disclosed in "Image distortion-correcting program, image-distortion correcting apparatus, image distortion-correcting method, and recording medium storing image distortion-correcting program" (Japanese Patent Application Laid-Open No. 2005-514903), which is a prior invention of the present applicant, creates an image where image distortion is corrected by extracting a set of parallel geodesic projections from a focused image of a three-dimensional paper curved surface, to extract a set of ruled line projections by using such a property that paper is a ruled surface, estimating the three-dimensional paper curved surface from the set of parallel geodesic projections and the set of ruled line projections, and determining a pixel-to-pixel correspondence between the estimated three-dimensional paper curved surface and the focused image.

In the prior invention, modeling of the three-dimensional paper curved surface is performed first. The three-dimensional paper curved surface is a ruled surface satisfying such a property that "at an optional point on a curved surface, a ruled line, which is a straight line passing that point and included in the curved surface, is present". Further, there is such a property that "on the three-dimensional paper curved surface, parallel lines on an expanded sheet of paper becomes parallel geodesic lines". By using the ruled line and the parallel geodesic lines, the three-dimensional paper curved surface is expressed as: $x(s, t)=(1-t)x^U(S)+tx^D(S)$, by using a curvilinear coordinate system (s, t) ($0 \leq s \leq 1$, $0 \leq t \leq 1$), as shown (a) in FIG. 1. As shown (b) in FIG. 1, $x^U(S)$ expresses a point constituting a top parallel geodesic line, which is a parallel geodesic line positioned at an upper end on the three-dimensional paper curved surface, and $x^D(s)$ expresses a point constituting a bottom parallel geodesic line, which is a parallel geodesic line positioned at a lower end on the three-dimensional paper curved surface. A parameter (s) is set so that a straight line passing the point $x^U(S)$ on the top parallel geodesic line and the point $x^D(s)$ on the bottom parallel geodesic line becomes the ruled line. In the equation shown in (a) in FIG. 1, the ruled line is expressed by fixing (s), and the parallel geodesic line is expressed by fixing (t). For example, as shown in (b) in FIG. 1, at (t=0), the top parallel geodesic line is expressed, at (t=1), the bottom parallel geodesic line is expressed, and at (t) other than those, inner parallel geodesic lines between the top parallel geodesic line and the bottom parallel geodesic line are expressed.

Modeling of the focused image is performed. As shown in FIG. 1C, the focused image taken by a digital camera or the like is obtained by perspective projection from the three-dimensional paper curved surface in an xyz coordinate space to an xy plane centering on a camera center $x^c=(x^c,y^c,z^c)$. A curve on an image obtained by perspective projection of the parallel geodesic lines on the three-dimensional paper curved surface is referred to as "parallel geodesic projection", and is expressed as a point $X^a=(X^a,Y^a,0)$ constituting a parallel geodesic projection on an image corresponding to a point $x^a=(x^a,y^a,z^a)$ constituting a parallel geodesic line. In the case of a=U, the curve expresses the top parallel geodesic projection, which is perspective projection of the top parallel geodesic line. In the case of a=D, the curve expresses the bottom parallel geodesic projection, which is perspective projection of the bottom parallel geodesic line, and in the case of a=i, the curve expresses the inner parallel geodesic projection, which is perspective projection of the inner parallel geodesic line. As shown in FIG. 1C, if it is assumed that an interior division ratio between a height of the camera center and a height of a point constituting the parallel geodesic line is $h^a$, an equation shown in FIG. 1D is established between the point constituting the parallel geodesic line and the point constituting the parallel geodesic projection obtained by perspective projection of this point. Accordingly, the three-dimensional paper curved surface is associated with the focused image obtained by the perspective projection.

In the prior invention, the set of parallel geodesic projections is extracted first from the focused image by using these models. Specifically, a distorted character string or rule mark, which has been a parallel line on the expanded sheet of paper, is extracted from the focused image, to extract a set of parallel geodesic projections by image processing by extracting a connected component or using proximity based on the extracted character string or rule mark. For example, from the focused image shown in (a) in FIG. 2, a set of a plurality of parallel geodesic projections shown by black line in (b) in FIG. 2 is extracted.

Figure 3A:
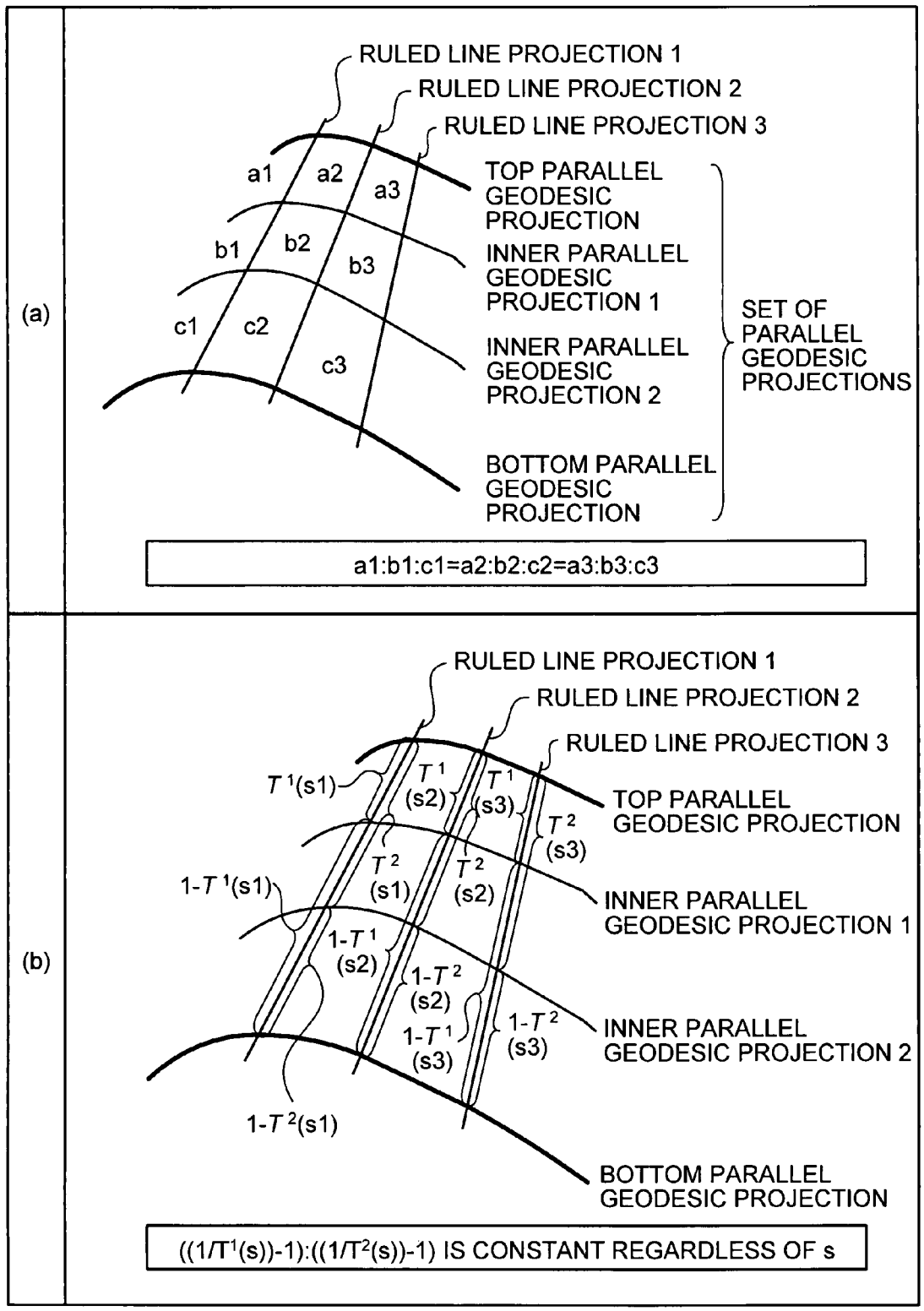
FIG. 3A is a schematic for explaining a property and an extraction condition of the ruled line projections.

A set of ruled line projections, in which the ruled line on the three-dimensional paper curved surface is a straight line obtained by perspective projection onto the xy plane, is extracted from the focused image. At the time of extracting the set of ruled line projection, such a property that "a ratio of segment lengths obtained by dividing the rules line projections by the set of parallel geodesic projections is constant" is used as a condition for extracting the set of ruled line projections. This condition is specifically explained. As shown in (a) in FIG. 3A, ruled line projection 1 is divided into "a1", "b1", and "c1" by the set of parallel geodesic projections including the top parallel geodesic projection, the bottom parallel geodesic projection, and two inner parallel geodesic projections 1 and 2. When ruled line projection 2 is then divided into "a2", "b2", and "c2", and ruled line projection 3 is divided into "a3", "b3", and "c3", such a relation as "a1:b1:c1=a2:b2:c2=a3:b3:c3" can be obtained.

By using this interior division ratio, following expression is obtained. Following values are defined by designating a parameter "s" corresponding to the ruled line of ruled line projection 1 on the three-dimensional paper curved surface as "s1", a parameter "s" corresponding to the ruled line of ruled line projection 2 on the three-dimensional paper curved surface as "s2", and a parameter "s" corresponding to the ruled line of ruled line projection 3 on the three-dimensional paper curved surface as "s3". That is, in ruled line projection 1, $T^1(s1)=a1/(a1+b1+c1)$, $T^2(s1)=(a1+b1)/(a1+b1+c1)$; in ruled line projection 2, $T^1(s2)=a1/(a2+b2+c2)$, $T^2(s2)=(a2+b2)/(a2+b2+c2)$; and in ruled line projection 3, $T^1(s3)=a3/(a3+b3+c3)$, $T^2(s3)=(a3+b3)/(a3+b3+c3)$. Superscript number "1" denotes inner parallel geodesic projection 1, and "2" denotes inner parallel geodesic projection 2. Accordingly, the interior division ratio when ruled line projection 1 is divided by a point of intersection with inner parallel geodesic projection 1 is $T^1(s1):1-T^1(s1)$, and the interior division ratio when ruled line projection 1 is divided by a point of intersection with inner parallel geodesic projection 2 is $T^2(s1):1-T^2(s1)$. The interior division ratio when ruled line projection 2 is divided by, a point of intersection with inner parallel geodesic projection 1 is $T^1(s2):1-T^1(s2)$, and the interior division ratio when ruled line projection 2 is divided by a point of intersection with inner parallel geodesic projection 2 is $T^2(s2):1-T^2(s2)$. The interior division ratio when ruled line projection 3 is divided by a point of intersection with inner parallel geodesic projection 1 is $T^1(s3):1-T^1(s3)$, and the interior division ratio when ruled line projection 3 is divided by a point of intersection with inner parallel geodesic projection 2 is $T^2(s3):1-T^2(s3)$. The condition that "the ratio of the divided segment lengths is constant" can be expressed as "$((T^1(s))-1):((T^2(s))-1)$, which is a ratio of interior division percentage determined by the interior division ratio, is constant in all the ruled line projections (in all parameters "s"), as shown in (b) in FIG. 3A.

If the interior division ratio when the ruled line projection corresponding to a ruled line expressed by the parameter (s) is interiorly divided by N inner parallel geodesic projections is defined as N-dimensional vector T(s) as shown in (c) in FIG. 3B, the condition using the interior division ratio can be generalized as "N-dimensional vector T(s) is equal in all parameters (s)".

To evaluate a set of straight lines on the focused image as a set of ruled-line candidate projections, which is a search target of a set of ruled line projections, dispersion of N-dimensional vector T(s) ("deviation" from the condition) in the respective sets of the ruled-line candidates needs only to be evaluated, and a set of ruled-line candidate projections having the smallest "deviation" is searched and extracted as the set of ruled line projections.

Figures 4, 5:
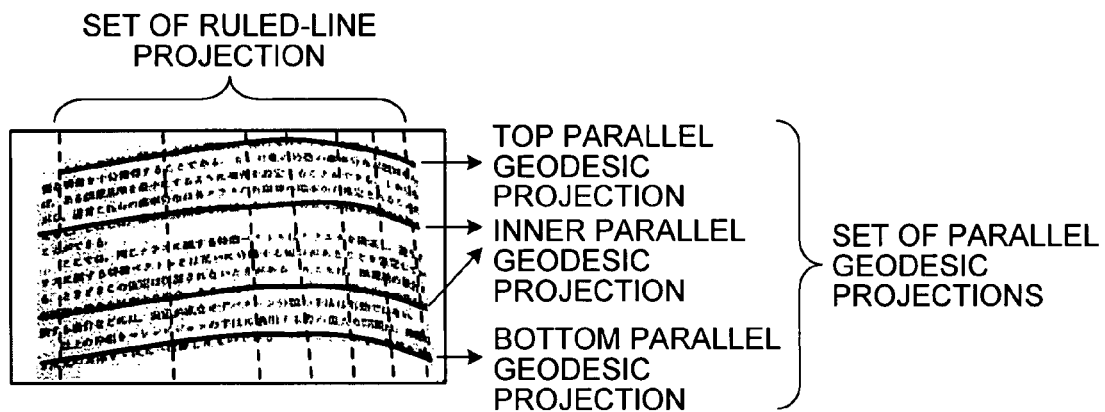
FIG. 4 is a schematic for explaining a set of extracted ruled line projections.
FIG. 5 is a schematic for explaining estimation of the three-dimensional paper curved surface.

To execute the above procedure, a cross ratio vector "U(s)" shown in (d) in FIG. 3B is defined. "k" shown in (d) in FIG. 3B is a normalizing coefficient for setting the length of vector "U(s)" to "1". "E", which is a sum total of "deviation" when a set of Ns ruled-line candidate projections is provided, is defined by an equation shown in (e) in FIG. 3B. A sign with line above U denotes a mean vector obtained by respective cross ratio vectors "U(s)" of Ns ruled-line candidate projections, which are accumulation targets of "deviation", and "$\|\cdot\|$" denotes a norm indicating a distance in a vector space. A set of ruled-line candidate projections having the smallest "E" is searched and extracted as a set of ruled line projections. For example, a set of ruled-line candidate projections shown by dotted line in FIG. 4 is extracted by searching a set of ruled line projections. Accordingly, the set of parallel geodesic projections can be associated with the set of ruled line projections.

Subsequently, the three-dimensional paper curved surface is estimated by the set of parallel geodesic projections and the set of ruled line projections. Specifically, a condition that "tangent vectors at respective points of intersection between the ruled line and the parallel geodesic line are parallel" is established from the property of the parallel geodesic line. Therefore, a tangent vector at a point of intersection $x^U(s)$ between the ruled line expressed by a certain parameter "s" and the top parallel geodesic line and a tangent vector at a point of intersection $x^D(s)$ between the same ruled line and the bottom parallel geodesic line are parallel with each other, and therefore a determinant shown in (a) in FIG. 5 can be obtained. A sign with dot (•) above a letter indicates that it is a derivative relative to the parameter "s". From this determinant, a function $f^a(s)$, which is a differential function (a=U) of the height of the interior division ratio of the top parallel geodesic line and a differential function (a=D) of the interior division ratio of the height of the bottom parallel geodesic line is determined, and the three-dimensional paper curved surface can be estimated based on an equation shown in (c) in FIG. 5.

Figure 6:
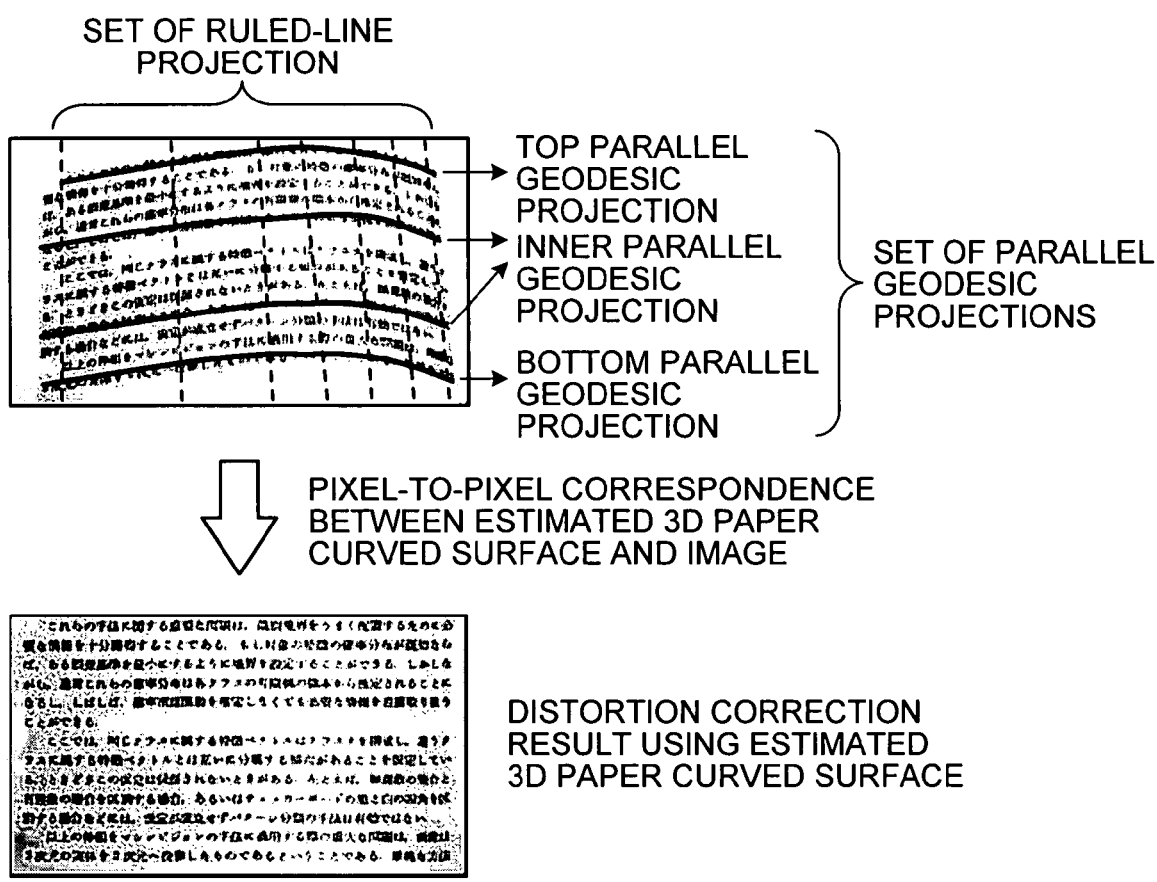
FIG. 6 is a schematic for explaining a distortion correction by correspondence.

An image, in which distortion is corrected in a focused image of a distorted three-dimensional paper curved surface, is created by determining a pixel-to-pixel correspondence between the estimated three-dimensional paper curved surface and the focused image. For example, a distortion correction result as shown in FIG. 6 is obtained.

Figure 7:
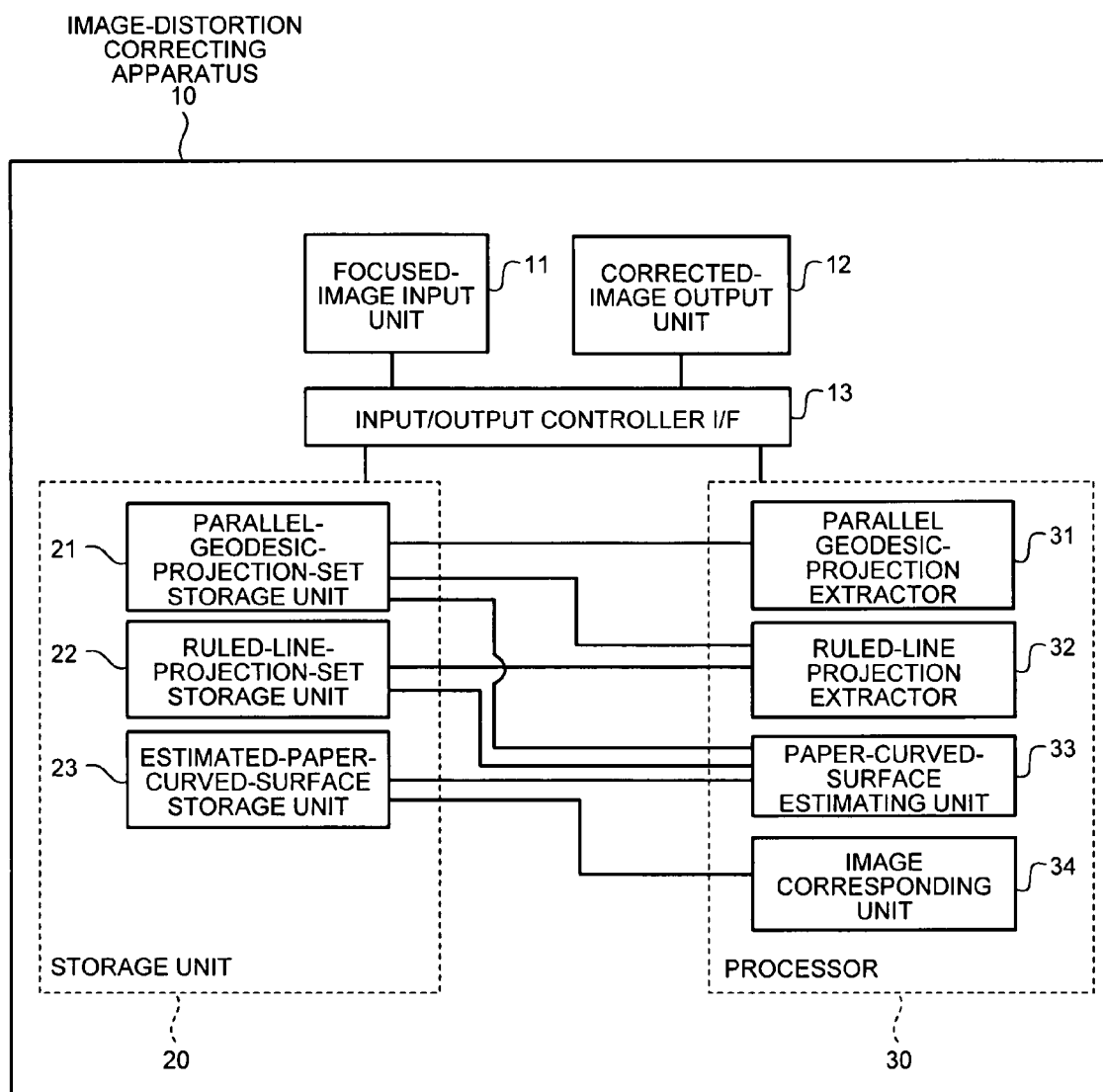
FIG. 7 is a block diagram of a configuration of an image-distortion correcting apparatus including a ruled-line-projection extracting apparatus according to a first embodiment of the present invention.
Figure 8:
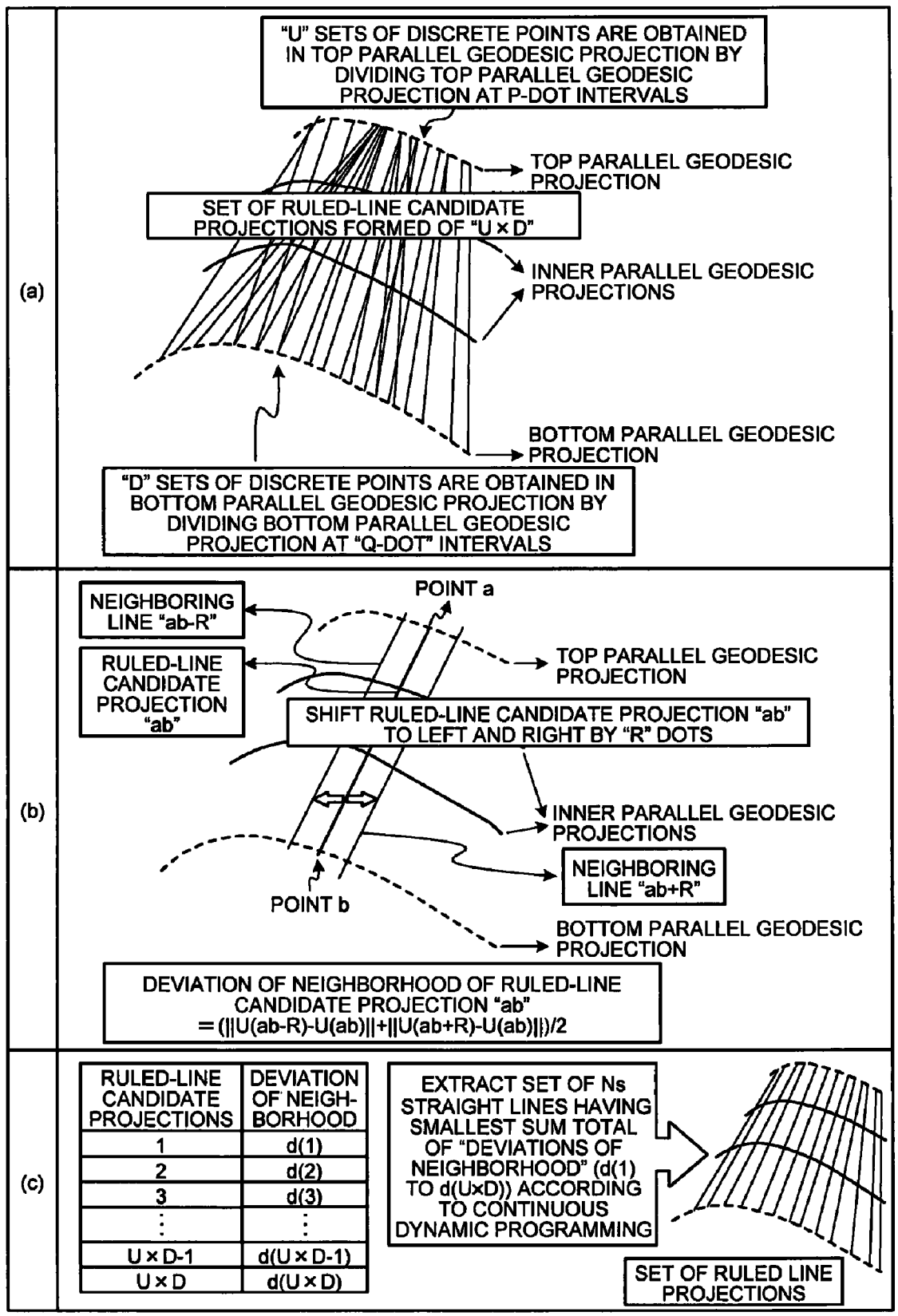
FIG. 8 is a schematic for explaining an outline and characteristics of the ruled-line-projection extracting apparatus according to the first embodiment.

The primary characteristic of the ruled-line-projection extracting apparatus according to the first embodiment is specifically explained with reference to FIGS. 7 and 8. FIG. 7 is a block diagram of the configuration of the image-distortion correcting apparatus including the ruled-line-projection extracting apparatus according to the first embodiment, and FIG. 8 is a schematic for explaining the outline and characteristics of the ruled-line-projection extracting apparatus according to the first embodiment.

As shown in FIG. 7, an image-distortion correcting apparatus 10 includes a focused-image input unit 11, a corrected-image output unit 12, an input/output controller I/F 13, a storage unit 20, and a processor 30.

The focused-image input unit 11 inputs a focused image used for various types of processing by the processor 30. Specifically, the focused-image input unit 11 directly inputs image data in which a distorted sheet of paper is imaged by a non-contact imaging device such as a digital camera, and stored in a format of, for example, Joint Photographic Experts Group (JPEG), from the non-contact imaging device. The image-distortion correcting apparatus 10 includes a keyboard and a touch panel as an input unit (not shown) to receive an image-distortion correction request.

The corrected-image output unit 12 outputs a distortion-corrected image from the focused image on the distorted three-dimensional paper curved surface obtained as a processing result by an image corresponding unit 34 to a display connected to, for example, the image-distortion correcting apparatus 10.

The input/output control I/F 13 controls data transfer between the focused-image input unit 11 and the corrected-image output unit 12, and between the storage unit 20 and the processor 30.

The storage unit 20 stores therein data used for various types of processing by the processor 30 and results of various types of processing by the processor 30, and includes, for example, as shown in FIG. 7, a parallel-geodesic-projection-set storage unit 21, a ruled-line-projection-set storage unit 22, and an estimated-paper-curved-surface storage unit 23. The respective parts will be described later.

The processor 30 executes various types of processing based on the image data transferred from the input/output control I/F 13, and includes, for example, as shown in FIG. 7, a parallel geodesic-projection extractor 31, a ruled-line projection extractor 32, a paper-curved-surface estimating unit 33, and the image corresponding unit 34.

The parallel geodesic-projection extractor 31 extracts parallel geodesic projection from the input image data to store a set of extracted parallel geodesic projections in the parallel-geodesic-projection-set storage unit 21. Specifically, the parallel geodesic-projection extractor 31 extracts a character string or a rule mark, and extracts a set of parallel geodesic projections by image processing by extracting a connected component or using proximity based on the extracted character string or rule mark. For example, from the focused image shown in (a) in FIG. 2, a set of a plurality of parallel geodesic projections shown by black line in (b) in FIG. 2 is extracted.

The ruled-line projection extractor 32 extracts the ruled line projection based on the set of parallel geodesic projections stored in the parallel-geodesic-projection-set storage unit 21 and stores the set of extracted ruled line projections in the ruled-line-projection-set storage unit 22. Specifically, the ruled-line projection extractor 32 searches for the set of ruled-line candidate projections, for example, shown by dotted line in FIG. 4, based on the condition such that "the interior division ratio determined from the ratio of segment lengths obtained by dividing respective ruled line projections by the set of parallel geodesic projections is constant", and extracts the set.

The paper-curved-surface estimating unit 33 estimates the three-dimensional paper curved surface from the set of parallel geodesic projections stored in the parallel-geodesic-projection-set storage unit 21 and the set of ruled line projections stored in the ruled-line-projection-set storage unit 22, and stores the result in the estimated-paper-curved-surface storage unit 23.

The image corresponding unit 34 generates a distortion-corrected image from the focused image of the distorted three-dimensional paper curved surface by determining a pixel-to-pixel correspondence between the estimated three-dimensional paper curved surface and the focused image. For example, a distortion correction result shown in FIG. 6 is obtained.

The ruled-line-projection extracting apparatus (a part formed of the ruled-line projection extractor 32 and the ruled-line-projection-set storage unit 22) according to the first embodiment generally searches for and extracts a set of ruled line projections based on the parallel geodesic projections extracted from an image obtained by imaging the three-dimensional paper curved surface, which is a ruled surface, as in the prior invention. However, as compared with the prior invention, it is primarily characterized in that a highly accurate and stable set of ruled line projections can be extracted.

The primary characteristic is briefly explained. At first, the ruled-line-projection extracting apparatus according to the first embodiment extracts a set of straight lines that associate the top parallel geodesic projection positioned at the upper end with the bottom parallel geodesic projection positioned at the lower end, among the sets of parallel geodesic projections, as a set of ruled-line candidate projections as a search target of a set of ruled line projections. For example, as shown in (a) in FIG. 8, "U" sets of discrete points are obtained in the top parallel geodesic projection by dividing the top parallel geodesic projection at P-dot intervals, and "D" sets of discrete points are obtained in the bottom parallel geodesic projection by dividing the bottom parallel geodesic projection at Q-dot intervals. A set of straight lines (a set of "U×D" straight lines) formed of all the combinations obtained by selecting one point each of "U" discrete points in the top parallel geodesic projection and "D" discrete points in the bottom parallel geodesic projection and connecting these selected points is extracted as the set of ruled-line candidate projections.

Subsequently, the ruled-line-projection extracting apparatus according to the first embodiment calculates a deviation of neighborhood, which is a distance between a cross ratio vector of the ruled-line candidate projection and a cross ratio vector of a neighboring line obtained by shifting the ruled-line candidate projection by a predetermined interval, for each ruled-line candidate projection. That is, a deviation of neighborhood is calculated for each of "U×D" ruled-line candidate projections shown in (a) in FIG. 8. For example, as shown in (b) in FIG. 8, a neighboring line "ab−R" obtained by shifting a ruled-line candidate projection "ab" passing through a discrete point "a" in the top parallel geodesic projection and a discrete point "b" in the bottom parallel geodesic projection to the left by "R" dots, and a neighboring line "ab+R" obtained by shifting the ruled-line candidate projection "ab" to the right by "R" dots are set, to calculate U(ab), which is a cross ratio vector of the ruled-line candidate projection "ab", U(ab−R), which is a cross ratio vector of the neighboring line "ab−R", and U(ab+R), which is a cross ratio vector of the neighboring line "ab+R" by using the equation shown in (d) in FIG. 3B. A distance (norm) between U(ab) and U(ab−R) and a distance (norm) between U(ab) and U(ab+R) are calculated to determine a mean value of these. The mean value is designated as the "deviation of neighborhood". This calculation is performed for each of "U×D" ruled-line candidate projections. The "cross ratio vector" corresponds to a "vector" in the appended claims.

The ruled-line-projection extracting apparatus according to the first embodiment stores and holds the calculated "deviation of neighborhood" for each of the ruled-line candidate projections. Specifically, as shown in a table of (c) in FIG. 8, the ruled-line-projection extracting apparatus stores and holds the "deviation of neighborhood" (d(1) to d(U×D)) for each of the ruled-line candidate projections.

The ruled-line-projection extracting apparatus according to the first embodiment then extracts a set of straight lines having the smallest sum total of deviations of neighborhood, in the set of straight lines, which do not intersect with each other, among the sets of ruled-line projection candidates, as a set of ruled line projections by continuous dynamic programming. In other words, a set of Ns straight lines having the smallest sum total of "deviations of neighborhood" (d(1) to d(U×D) shown in (c) in FIG. 8, in a set of straight lines (Ns), which do not intersect with each other, from "U×D" ruled-line projection candidates is extracted as the set of ruled line projections by the continuous dynamic programming. This problem is a combination optimization problem to determine a combination having the smallest sum total by selecting Ns variables from "U×D" variables (deviations of neighborhood) under a condition of "straight lines that do not intersect with each other". By using the continuous dynamic programming as a problem in which the "principle of optimality" is established, this problem can be solved by a smaller calculation amount than a case that the sum total of deviations of neighborhood is calculated for all combinations and compared with each other.

The reason why the deviation of neighborhood is used is based on an assumption that 'a value of "deviation of neighborhood", which is a distance between the cross ratio vector of the ruled-line candidate projection and the cross ratio vector of a neighboring line obtained by shifting the ruled-line candidate projection by a predetermined interval, is small if the ruled-line candidate projection is a line satisfying the "condition as the ruled line projection", and the value of "deviation of neighborhood" is large, if the ruled-line candidate projection is a line deviated from the "condition as the ruled line projection"'.

Accordingly, the ruled-line-projection extracting apparatus according to the first embodiment can extract a set of ruled line projections formed of an optimum combination with a smaller calculation amount, as compared to a case that evaluation as the ruled line projection is performed relative to all combinations selected from the set of ruled-line candidate projections, and therefore can extract the highly accurate and stable set of ruled line projections as described as the primary characteristic.

Figure 9:
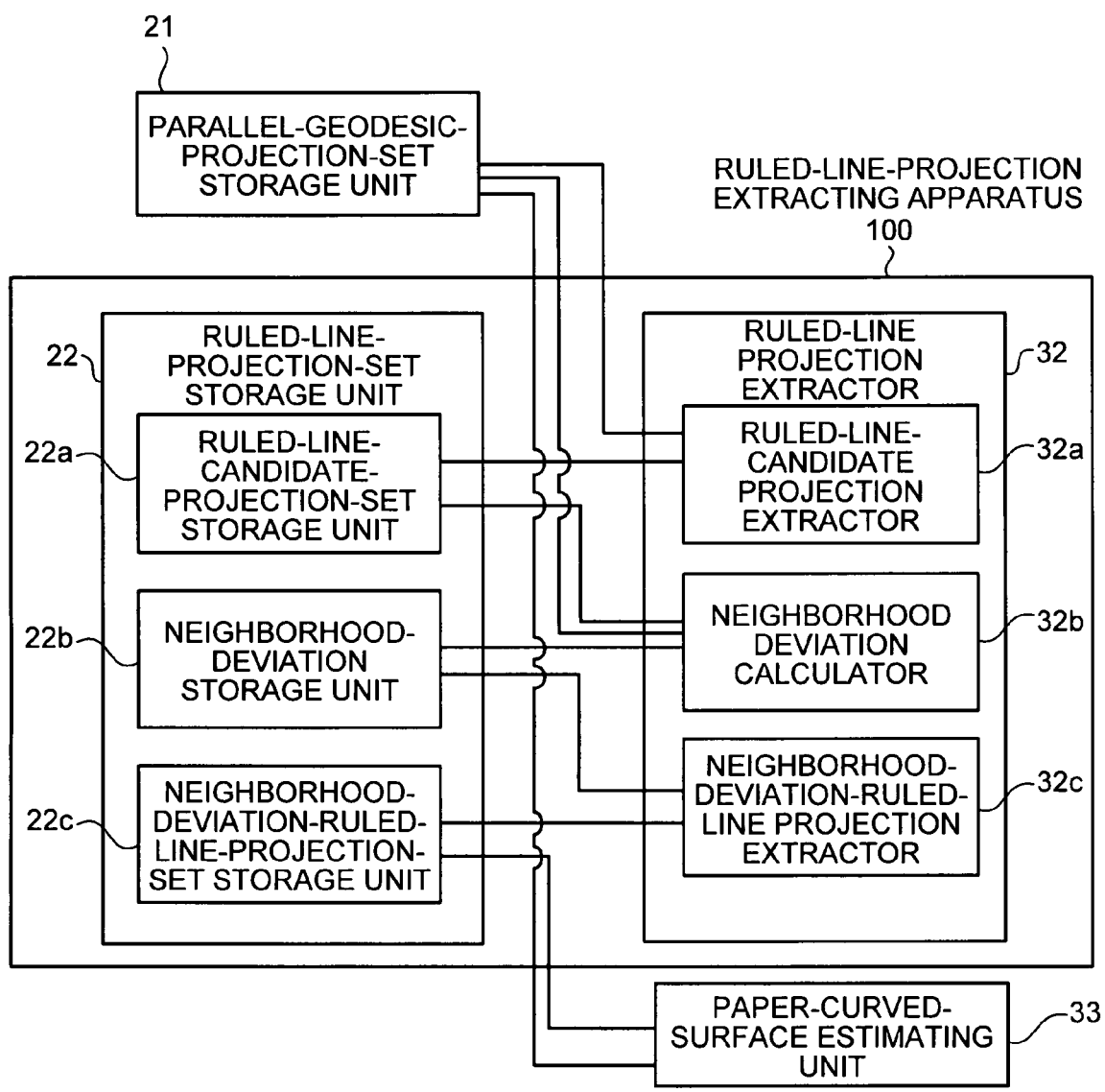
FIG. 9 is a block diagram of the ruled-line-projection extracting apparatus according to the first embodiment.

The ruled-line-projection extracting apparatus according to the first embodiment is explained with reference to FIG. 9. FIG. 9 is a block diagram of the configuration of the ruled-line-projection extracting apparatus according to the first embodiment.

As shown in FIG. 9, a ruled-line-projection extracting apparatus 100 according to the first embodiment is formed of the ruled-line projection extractor 32 in the image-distortion correcting apparatus 10 and the ruled-line-projection-set storage unit 22, extracts the ruled line projection based on the set of parallel geodesic projections stored in the parallel-geodesic-projection-set storage unit 21. The paper-curved-surface estimating unit 33 estimates the three-dimensional paper curved surface based on the result.

The ruled-line-projection-set storage unit 22 stores therein results of various types of processing performed by the ruled-line projection extractor 32 described later and includes, as shown in FIG. 9, a ruled-line-candidate-projection-set storage unit 22a, a neighborhood-deviation storage unit 22b, and a neighborhood-deviation-ruled-line-projection-set storage unit 22c as parts closely related to the present invention. The neighborhood-deviation storage unit 22b corresponds to "storing and holding (of the deviation of neighborhood)" described in the appended claims. The ruled-line-candidate-projection-set storage unit 22a stores therein the set of ruled-line candidate projections extracted by a ruled-line-candidate projection extractor 32a described later, and the neighborhood-deviation storage unit 22b stores therein a neighborhood deviation calculated by a neighborhood deviation calculator 32b described later for each ruled-line candidate projection, and the neighborhood-deviation-ruled-line-projection-set storage unit 22c stores therein the set of ruled line projections extracted by a neighborhood-deviation-ruled-line projection extractor 32c described later.

The ruled-line projection extractor 32 executes various types of processing based on the set of parallel geodesic projections stored in the parallel-geodesic-projection-set storage unit 21 and includes, as shown in FIG. 9, the ruled-line-candidate projection extractor 32a, the neighborhood deviation calculator 32b, and the neighborhood-deviation-ruled-line projection extractor 32c as parts closely related to the present invention. The ruled-line-candidate projection extractor 32a corresponds to "first extracting (of ruled-line candidate projections)" in the appended claims, the neighborhood deviation calculator 32b corresponds to "calculating (of a deviation of neighborhood)" in the claims, and the neighborhood-deviation-ruled-line projection extractor 32c corresponds to "second extracting (of ruled line projections)" in the claims. The respective parts will be described later in detail.

The ruled-line-candidate projection extractor 32a extracts the set of straight lines that associate the top parallel geodesic projection positioned at the upper end and the bottom parallel geodesic projection positioned at the lower end, of the set of parallel geodesic projections, as a set of ruled-line candidate projections, which is a search target of the set of ruled line projections and stores therein the result in the ruled-line-candidate-projection-set storage unit 22a. For example, as shown in (a) in FIG. 8, the top parallel geodesic projection is divided at P-dot intervals to obtain "U" sets of discrete points in the top parallel geodesic projection. The bottom parallel geodesic projection is divided at Q-dot intervals to obtain "D" sets of discrete points in the bottom parallel geodesic projection. The ruled-line-candidate projection extractor 32a extracts a set of straight lines (a set of U×D straight lines) formed of all the combinations obtained by selecting one point each of "U" discrete points in the top parallel geodesic projection and "D" discrete points in the bottom parallel geodesic projection and connecting these selected points, as the set of ruled-line candidate projections.

The neighborhood deviation calculator 32b calculates a neighborhood deviation, which is a distance between the cross ratio vector of the ruled-line candidate projection and the cross ratio vector of a neighboring line obtained by shifting the ruled-line candidate projection by a predetermined interval, for each of the ruled-line candidate projections, and stores the result in the neighborhood-deviation storage unit 22b. That is, the neighborhood deviation calculator 32b calculates the neighborhood deviation for each of "U×D" ruled-line candidate projections shown in (a) in FIG. 8. For example, as shown in (b) in FIG. 8, a neighboring line "ab−R" obtained by shifting a ruled-line candidate projection "ab" passing through a discrete point "a" in the top parallel geodesic projection and a discrete point "b" in the bottom parallel geodesic projection to the left by "R" dots, and a neighboring line "ab+R" obtained by shifting the ruled-line candidate projection "ab" to the right by "R" dots are set, to calculate U(ab), which is a cross ratio vector of the ruled-line candidate projection "ab", U(ab−R), which is a cross ratio vector of the neighboring line "ab−R", and U(ab+R), which is a cross ratio vector of the neighboring line "ab+R" by using the equation shown in (d) in FIG. 3B. A distance (norm) between U(ab) and U(ab−R) and a distance (norm) between U(ab) and U(ab+R) are calculated to determine a mean value of these. The mean value is designated as the "deviation of neighborhood". This calculation is performed for each of "U×D" ruled-line candidate projections.

For example, the distance (norm) between U(ab−R) and U(ab) can be calculated by using only one of the neighboring line "ab−R" and the neighboring line "ab+R", which can be calculated as the "deviation of neighborhood".

The neighborhood-deviation-ruled-line projection extractor 32c extracts a set of straight lines having the smallest sum total of deviations of neighborhood in the set of straight lines that do not intersect with each other among the set of ruled-line candidate projections, as the set of ruled line projections according to the continuous dynamic programming, and stores the result in the neighborhood-deviation-ruled-line-projection-set storage unit 22c. In other words, the neighborhood-deviation-ruled-line projection extractor 32c extracts a set of Ns straight lines having the smallest sum total of "deviations of neighborhood" (d(1) to d(U×D)) shown in the table in (c) in FIG. 8 as the set of ruled line projections according to the continuous dynamic programming.

The "continuous dynamic programming" is a solution capable of obtaining an optimal solution (for example, minimum value and maximum value) efficiently, when an n-order function "$J=f(x_1, x_2, \ldots, x_n)$" in which respective variables $x_i$ (i=1 to n) is formed of finite number of discrete values is expressed as a sum of two variable functions. For example, it is assumed that the n-order function "$J=f(x_1, x_2, \ldots, x_n)$" is expressed as a sum of two variable functions for each pair, such as "$J=f_1(x_1)+h_1(x_1,x_2)+h_2(x_2+x_3)+\ldots+h_{n-1}(x_{n-1},x_n)$", to obtain an optimal solution that gives the minimum value. At first, optimum "$x'_1$" in which "$f_1(x_1)+h_1(x_1,x_2)$" becomes the smallest is calculated for all of "$x_2$". When this is regarded as a function of "$x_3$" and designated as "$f_3(x_3)$", "J" becomes a function "$J=f_3(x_3)+h_3(x_3+x_4)+\ldots+h_{n-1}(x_{n-1},x_n)$" in which the number of variables further decreases by 1, which becomes a problem to obtain an optimal solution that gives the minimum value. This is repeated sequentially, and finally, by obtaining an optimum "$x'_n$" that gives the minimum value of linear function "$J=f_n(x_n)$", a combination of variables $x_i$ (i=1 to n) that gives an optimal solution can be calculated, by going back "$x'_{n-1}$" that gives "$x'_n$", "$x'_{n-2}$" that gives "$x'_{n-1}$", ..., and "$x'_1$" that gives "$x'_2$". According to this solution, a "set of ruled line projections", which is a "set of straight lines" formed of Ns variables in which ["optimal solution=sum total of deviation of neighborhood" becomes the minimum value] can be obtained efficiently.

Figure 10:
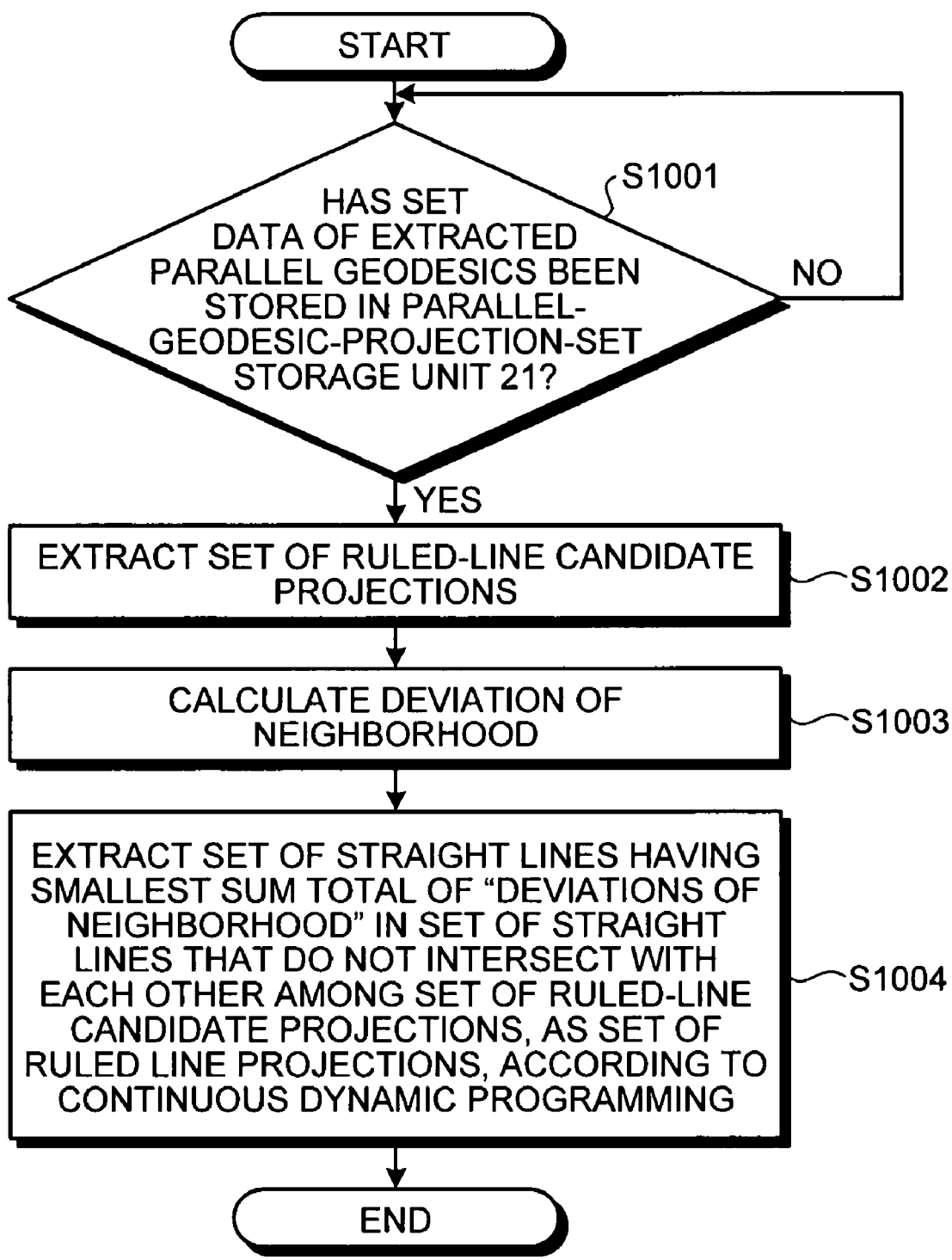
FIG. 10 is a flowchart for explaining a process procedure performed by the ruled-line-projection extracting apparatus according to the first embodiment.

A process performed by the ruled-line-projection extracting apparatus 100 according to the first embodiment is explained with reference to FIG. 10. FIG. 10 is a flowchart of a process procedure performed by the ruled-line-projection extracting apparatus according to the first embodiment.

In the ruled-line-projection extracting apparatus 100 according to the first embodiment, when set data of extracted parallel geodesics is stored in the parallel-geodesic-projection-set storage unit 21 (YES at step S1001), the ruled-line-candidate projection extractor 32a extracts the set of straight lines that associate the top parallel geodesic projection positioned at the upper end with the bottom parallel geodesic projection positioned at the lower end in the set of parallel geodesic projections, as the set of ruled-line candidate projections, which is a search target of the set of ruled line projections (step S1002).

For example, as shown in (a) in FIG. 8, the ruled-line-candidate projection extractor 32a obtains "U" sets of discrete points in the top parallel geodesic projection and "D"

sets of discrete points in the bottom parallel geodesic projection. The ruled-line-candidate projection extractor 32a then extracts a set of straight lines (a set of U×D straight lines) formed of all the combinations obtained by selecting one point each of "U" discrete points in the top parallel geodesic projection and "D" discrete points in the bottom parallel geodesic projection and connecting these selected points, as the set of ruled-line candidate projections.

The neighborhood deviation calculator 32b calculates a neighborhood deviation, which is a distance between the cross ratio vector of the ruled-line candidate projection and the cross ratio vector of a neighboring line obtained by shifting the ruled-line candidate projection by a predetermined interval, for each of the ruled-line candidate projections (step S1003). That is, the neighborhood deviation calculator 32b calculates the neighborhood deviation for each of "U×D" ruled-line candidate projections shown in (a) in FIG. 8.

For example, as shown in (b) in FIG. 8, the neighborhood deviation calculator 32b sets the neighboring line "ab–R" and the neighboring line "ab+R" relative to the ruled-line candidate projection "ab", calculates "(‖U(ab–R)–U(ab)‖+‖U(ab+R)–U(ab)‖)/2" from U(ab), U(ab–R), and U(ab+R) calculated by using the equation shown in (d) in FIG. 3B, and designates the value as "deviation of neighborhood".

The neighborhood-deviation-ruled-line projection extractor 32c extracts the set of straight lines having the smallest sum total of deviation of neighborhood as the set of ruled line projections in the set of straight lines that do not intersect with each other among the set of ruled-line candidate projections, as the set of ruled line projections according to the continuous dynamic programming (step S1004) to finish the process. In other words, the neighborhood-deviation-ruled-line projection extractor 32c extracts a set of Ns straight lines having the smallest sum total of "deviations of neighborhood" (d(1) to d(U×D)) shown in the table in (c) in FIG. 8, as the set of ruled line projections, among the (Ns)sets of straight lines that do not intersect with each other from the U×D ruled-line candidate projections according to the continuous dynamic programming.

According to the first embodiment, the set of straight lines that associate the top parallel geodesic projection positioned at the upper end with the bottom parallel geodesic projection positioned at the lower end is extracted from the sets of parallel geodesic projections as the set of ruled-line candidate projections, which is a search target of the set of ruled line projections. The deviation of neighborhood, which is the distance between the cross ratio vector of the extracted ruled-line candidate projection and the cross ratio vector of the neighboring line obtained by shifting the ruled-line candidate projection by a predetermined interval is calculated for each of the ruled-line candidate projections. The set of straight lines having the smallest sum total of deviations of neighborhood is then extracted as the set of ruled line projections, in the sets of straight lines that do not intersect with each other among the sets of ruled-line candidate projections according to the continuous dynamic programming. Accordingly, the set of ruled line projections formed of an optimum combination can be extracted with a smaller calculation amount, as compared to a case that evaluation as the ruled line projection is performed relative to all combinations selected from the set of ruled-line candidate projections, and therefore the highly accurate and stable set of ruled line projections can be extracted from an image obtained by imaging a paper curved surface, which is a distorted sheet of paper, thereby enabling correction of paper distortion highly accurately and stably.

A case that the set of straight lines having the smallest sum total of "deviation of neighborhood" is extracted as the set of ruled line projections by the continuous dynamic programming has been explained. However, in the second embodiment, there is explained a case that a set of straight lines having the smallest sum total of "deviations" from an average vector of optionally selected ruled-line projections is minimum is extracted as a new set of selected ruled-line projections by the continuous dynamic programming, and this process is repeatedly performed to extract the set of selected ruled-line projections, when a decrease of the sum total of the "deviation" is settled, as a set of ruled line projections.

Figure 11A:
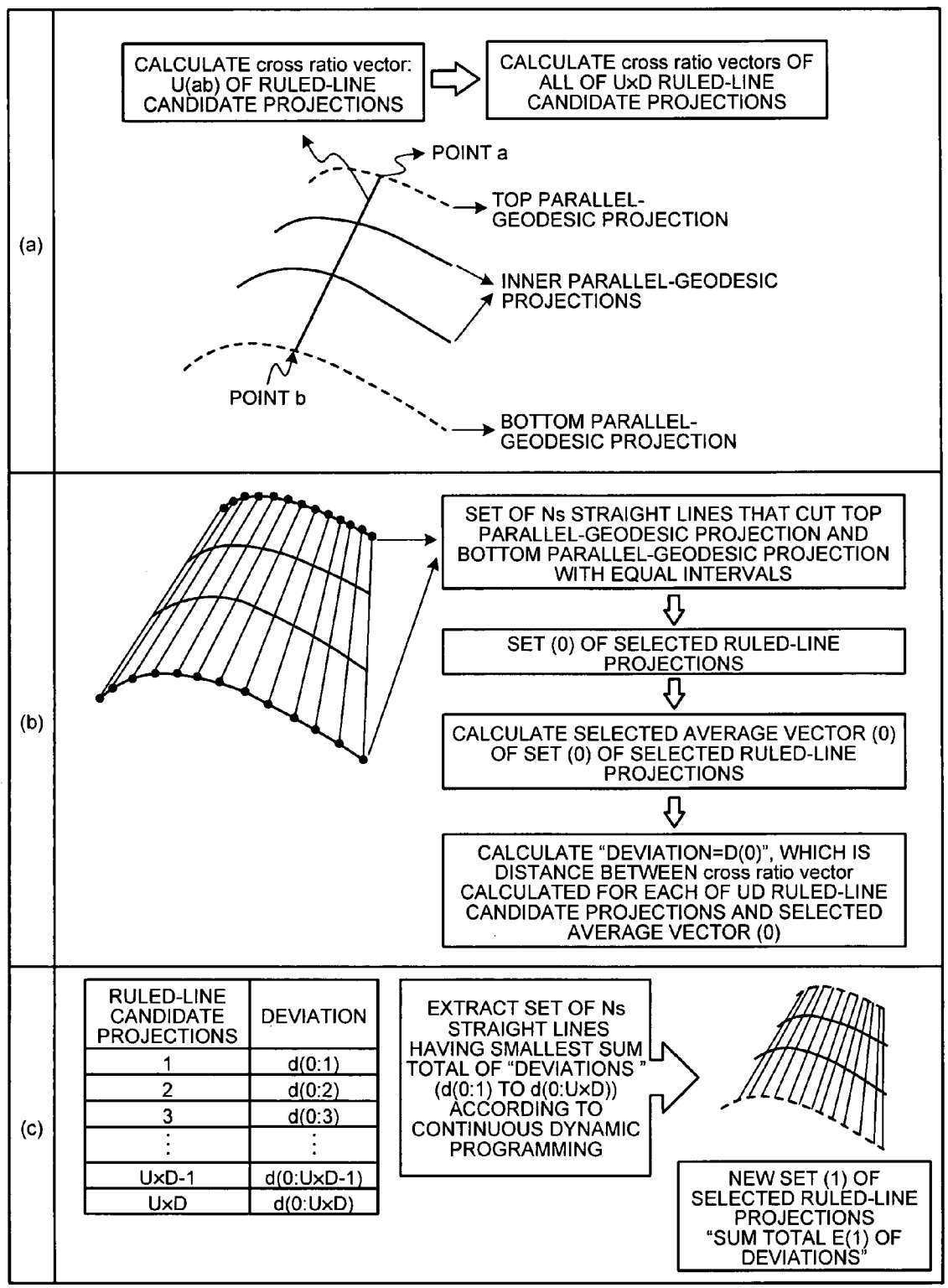
FIG. 11A is a schematic for explaining an outline and characteristics of a ruled-line-projection extracting apparatus according to a second embodiment of the present invention.
Figure 11B:
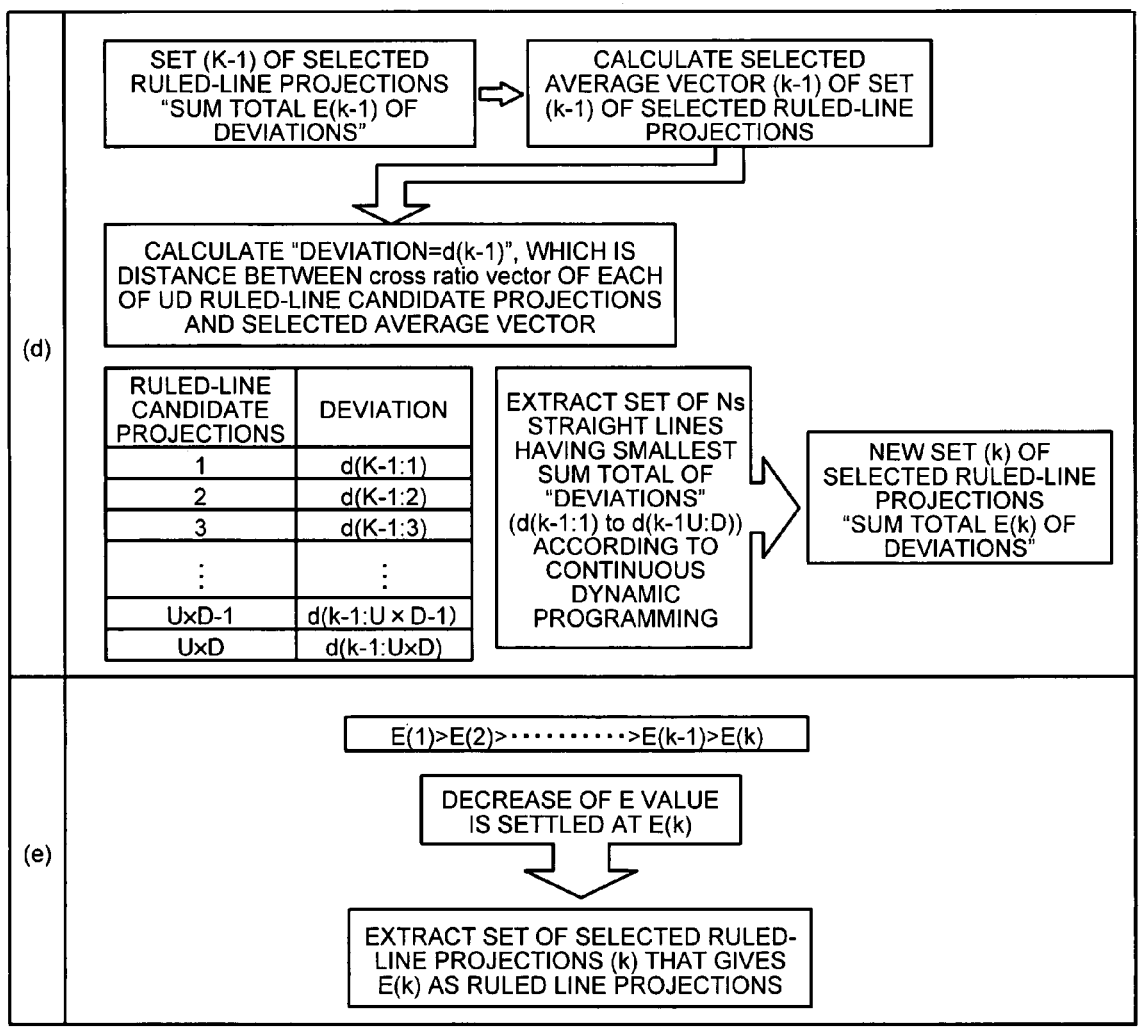
FIG. 11B is another schematic for explaining an outline and characteristics of the ruled-line-projection extracting apparatus according to the second embodiment.

The primary characteristic of the ruled-line-projection extracting apparatus according to the second embodiment is specifically explained with reference to FIGS. 11A and 11B. FIGS. 11A and 11B are explanatory diagrams of an outline and characteristics of the ruled-line-projection extracting apparatus according to the second embodiment.

The ruled-line-projection extracting apparatus according to the second embodiment extracts a set of straight lines that associate the top parallel geodesic projection positioned at the upper end with the bottom parallel geodesic projection positioned at the lower end from the set of parallel geodesic projections, as a set of ruled-line candidate projections, which is a search target of the set of ruled line projections, as in the ruled-line-projection extracting apparatus 100 according to the first embodiment. For example, as shown in (a) in FIG. 8, the ruled-line-projection extracting apparatus extracts the set of straight lines (set of U×D straight lines) formed of all the combinations obtained by selecting one point each of "U" discrete points in the top parallel geodesic projection and "D" discrete points in the bottom parallel geodesic projection and connecting these selected points, as the set of ruled-line candidate projections.

The ruled-line-projection extracting apparatus according to the second embodiment calculates the cross ratio vector of the ruled-line candidate projection for each ruled-line candidate projection. That is, as shown in (a) in FIG. 11A, the ruled-line-projection extracting apparatus calculates U(ab), which is the cross ratio vector of the ruled-line candidate projection "ab" passing through the discrete point "a" in the top parallel geodesic projection and the discrete point "b" in the bottom parallel geodesic projection, by using the numerical expression shown in (d) in FIG. 3B, and repeats this calculation relative to each of U×D ruled-line candidate projections.

Subsequently, the ruled-line-projection extracting apparatus according to the second embodiment calculates a deviation, which is a distance between the cross ratio vector of the ruled-line candidate projection and a selected average vector, which is an average of the cross ratio vectors of the respective selected ruled-line projections in the set of selected ruled-line projections optionally selected as the set of ruled line projections, for each ruled-line candidate projection.

For example, as shown in (b) in FIG. 11A, the ruled-line-projection extracting apparatus selects a set of Ns straight lines that cut the top parallel geodesic projection and the bottom parallel geodesic projection with equal intervals, as a set (0) of selected ruled-line projections, and calculates the cross ratio vector for each selected ruled-line projection by using the numerical expression shown in (d) in FIG. 3B, thereby calculating a selected average vector (0), which is an average vector of these cross ratio vectors. The ruled-line-projection extracting apparatus calculates "deviation=d(0)", which is a distance between the cross ratio vector calculated for each of U×D ruled-line candidate projections and the selected average vector (0), and stores "deviation": d(0:1) to d(0:U×D) for each ruled-line candidate projection as shown in a table of (c) in FIG. 11A.

The ruled-line-projection extracting apparatus according to the second embodiment extracts a set of straight lines having the smallest sum total of deviations as a new set of selected ruled-line projections, in the set of straight lines that do not intersect with each other among the sets of ruled-line candidate projections, according to the continuous dynamic programming. That is, as shown in (c) in FIG. 11A, the ruled-line-projection extracting apparatus extracts the set of straight lines having the smallest sum total of deviations as a new set (1) of the selected ruled-line projections in (Ns) sets of straight lines that do not intersect with each other among the sets of the ruled-line candidate projections, according to the continuous dynamic programming. The sum total of "deviations" is a value defined by "E" calculated by the numerical expression shown in (e) in FIG. 3B, and the sum total of "deviations" of the newly extracted set (1) of selected ruled-line projections is assumed to be E(1).

The ruled-line-projection extracting apparatus then repeatedly executes a process for calculating a "deviation" for each ruled-line candidate projection based on the "cross ratio vector of the ruled-line candidate projection" and the "selected average deviation calculated from the set of newly extracted selected ruled-line projections", and a process for extracting a set of straight lines having the smallest sum total of deviations as a set of newly selected ruled-line projections in the set of straight lines that do not intersect with each other among the sets of ruled-line candidate projections according to the continuous dynamic programming, to extract the set of selected ruled-line projections when a decrease of the sum total of deviations is settled as the set of ruled line projections.

In other words, as shown in (d) in FIG. 11B, a process for calculating a "deviation": d(k−1:1) to d(k−1:U×D) for each ruled-line candidate projection from the "cross ratio vector of the ruled-line candidate projection" and the [selected average vector (k−1) calculated from the set (k−1) of selected ruled-line projections having a sum total of "deviations" of E(k−1)], and a process for extracting the set of straight lines having the smallest sum total of "deviations" in the (Ns) sets of straight lines that do not intersect with each other among the sets of ruled-line projection candidates as a new [set (k) of selected ruled-line projections: the sum total of "deviations" being E(k)] according to the continuous dynamic programming are repeatedly executed. When a decreasing rate of E(k−1) and E(k), "(E(k−1)−E(k))/E(k−1)", is smaller than a predetermined value (for example, 0.1%), it is regarded that a decrease of the sum total of deviations is settled, to extract the set (k) of selected ruled-line projections as the set of ruled line projections (see (e) in FIG. 11B).

The ruled-line-projection extracting apparatus according to the second embodiment can repeatedly extract the set of ruled line projections formed of an optimum combination with a smaller calculation amount, as compared to a case that evaluation as the ruled line projection is performed relative to all combinations selected from the set of ruled-line candidate projections. Accordingly, the ruled-line-projection extracting apparatus according to the second embodiment can extract the highly accurate and stable set of ruled line projections from an image obtained by imaging a paper curved surface, which is a distorted sheet of paper, thereby enabling correction of paper distortion highly accurately and stably.

Figure 12:
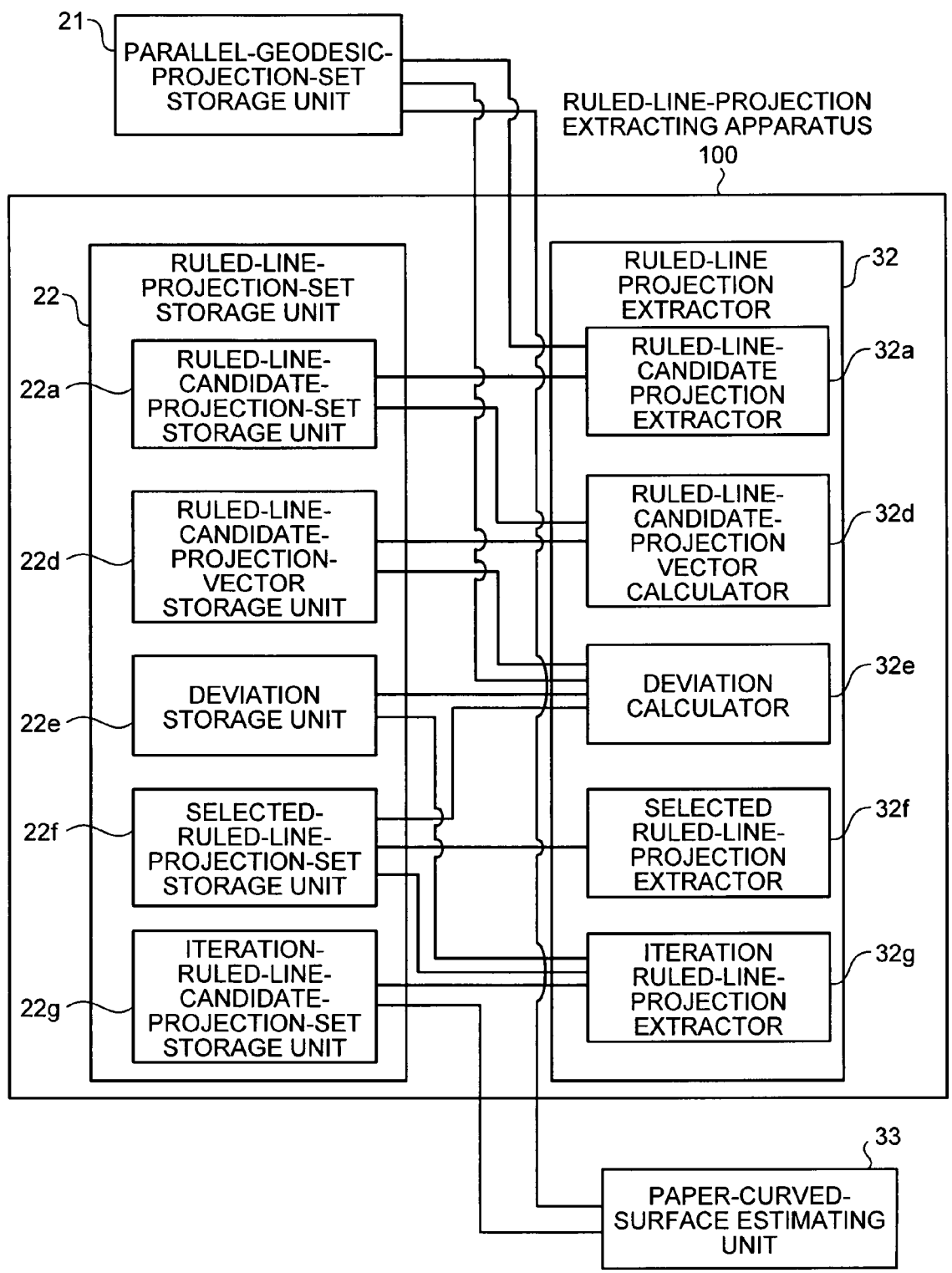
FIG. 12 is a block diagram of the ruled-line-projection extracting apparatus according to the second embodiment.

The ruled-line-projection extracting apparatus according to the second embodiment is explained with reference to FIG. 12. FIG. 12 is a block diagram of the configuration of the ruled-line-projection extracting apparatus according to the second embodiment.

As shown in FIG. 12, the ruled-line-projection extracting apparatus 100 according to the second embodiment includes, as in the first embodiment, the ruled-line projection extractor 32 in the image-distortion correcting apparatus 10 and the ruled-line-projection-set storage unit 22, and extracts a ruled line projection based on the set of parallel geodesic projections stored in the parallel-geodesic-projection-set storage unit 21. The paper-curved-surface estimating unit 33 estimates a three-dimensional paper curved surface.

The ruled-line-projection-set storage unit 22 stores therein results of various types of processing performed by the ruled-line projection extractor 32 described later and includes, as shown in FIG. 12, the ruled-line-candidate-projection-set storage unit 22a, a ruled-line-candidate-projection-vector storage unit 22d, a deviation storage unit 22e, a selected-ruled-line-projection-set storage unit 22f, and an iteration-ruled-line-candidate-projection-set storage unit 22g, as parts closely related to the present invention. The ruled-line-candidate-projection-vector storage unit 22d corresponds to "storing and holding (of the ruled-line-candidate projection vector)" described in the appended claims. The ruled-line-candidate-projection-set storage unit 22a stores therein the set of ruled-line candidate projections extracted by the ruled-line-candidate projection extractor 32a, and the ruled-line-candidate-projection-vector storage unit 22d stores therein the ruled-line-candidate projection vector calculated by a ruled-line-candidate-projection vector calculator 32d for each ruled-line candidate projection. The deviation storage unit 22e stores therein a deviation calculated by a deviation calculator 32e for each ruled-line candidate projection. The selected-ruled-line-projection-set storage unit 22f stores therein the set of selected ruled-line projections newly extracted by a selected ruled-line-projection extractor 32f. The iteration-ruled-line-candidate-projection-set storage unit 22g stores therein the set of rules line projections extracted by an iteration ruled-line-projection extractor 32g.

The ruled-line projection extractor 32 executes various types of processing based on the set of parallel geodesic projections stored in the parallel-geodesic-projection-set storage unit 21, and includes, as shown in FIG. 12, the ruled-line-candidate projection extractor 32a, the ruled-line-candidate-projection vector calculator 32d, the deviation calculator 32e, the selected ruled-line-projection extractor 32f, and the iteration ruled-line-projection extractor 32g, as parts closely related to the present invention. The ruled-line-candidate projection extractor 32a corresponds to "first extracting (of ruled-line candidate projections)" in the appended claims, the ruled-line-candidate-projection vector calculator 32d corresponds to "first calculating (of a ruled-line-candidate projection vector)" in the claims, and the deviation calculator 32e corresponds to "second calculating (of a deviation)" in the claims. Further, the selected ruled-line-projection extractor 32f corresponds to a "second extracting (of selected ruled-line projections)" and the iteration ruled-line-projection extractor 32g corresponds to "third extracting (of repeated ruled-line projections)" in the claims. Respective parts will be described later in detail.

As in the first embodiment, the ruled-line-candidate projection extractor 32a extracts the set of straight lines that associate the top parallel geodesic projection positioned at the upper end with the bottom parallel geodesic projection positioned at the lower end in the set of parallel geodesic projections, as the set of ruled-line candidate projections, which is a search target of the set of ruled line projections, and stored the extraction result in the ruled-line-candidate-projection-set storage unit 22a.

The ruled-line-candidate-projection vector calculator 32d calculates the cross ratio vector of the ruled-line candidate projection for each ruled-line candidate projection, and stores the calculation result in the ruled-line-candidate-projection-vector storage unit 22d. That is, as shown in (a) in FIG. 11A, U(ab), which is a cross ratio vector of the ruled-line candidate projection "ab", is calculated by using the numerical expression shown in (d) in FIG. 3B, and this calculation is performed for each of U×D ruled-line candidate projections.

Subsequently, the deviation calculator 32e calculates a deviation, which is a distance between the cross ratio vector of the ruled-line candidate projection and a selected average vector, which is an average of the cross ratio vectors of the respective selected ruled-line projections in the set of selected ruled-line projections optionally selected as the set of ruled line projections, for each ruled-line candidate projection, and stores the result in the deviation storage unit 22e.

For example, as shown in (b) in FIG. 11A, the deviation calculator 32e selects a set of Ns straight lines that cut the top parallel geodesic projection and the bottom parallel geodesic projection with equal intervals, as a set (0) of selected ruled-line projections, and calculates the cross ratio vector for each selected ruled-line projection by using the numerical expression shown in (d) in FIG. 3B, thereby calculating a selected average vector (0), which is an average vector of these cross ratio vectors. The deviation calculator 32e then calculates "deviation=d(0)", which is a distance between the cross ratio vector calculated for each of U×D ruled-line candidate pro-jections and the selected average vector (0), and stores "deviation": d(0:1) to d(0:U×D) for each ruled-line candidate projection as shown in the table of (c) in FIG. 11A in the deviation storage unit 22e.

The selected ruled-line-projection extractor 32f extracts a set of straight lines having the smallest sum total of deviations as a new set of selected ruled-line projections, in the set of straight lines that do not intersect with each other among the sets of ruled-line candidate projections, according to the continuous dynamic programming. That is, as shown in (c) in FIG. 11A, the selected ruled-line-projection extractor 32f extracts the set of straight lines having the smallest sum total of deviations calculated by the numerical expression shown in (e) in FIG. 3B, as a new [set 1) of the selected ruled-line projections: the sum total of "deviations" being E(1)], in (Ns) sets of straight lines that do not intersect with each other among the sets of the ruled-line candidate projections, according to the continuous dynamic programming. The continuous dynamic programming is a solution, as described in the first embodiment, capable of obtaining an optimal solution (for example, minimum value and maximum value) efficiently, when an n-order function "J=f($x_1$, $x_2$, . . . , $x_n$)" in which respective variables $x_i$ (i=1 to n) is formed of finite number of discrete values is expressed as a sum of two variable functions. In the second embodiment, a "set of ruled line projections", which is a "set of straight lines" formed of Ns variables in which ["optimal solution"=the sum total of "deviations" becomes the minimum value] can be obtained efficiently.

The iteration ruled-line-projection extractor 32g allows the deviation calculator 32e to repeat execution of the process for calculating the "deviation" based on the "cross ratio vector of the ruled-line candidate projection" held in the ruled-line-candidate-projection-vector storage unit 22d and the "set of selected ruled-line projections" newly stored in the selected-ruled-line-projection-set storage unit 22f, and the selected ruled-line-projection extractor 32f to repeat execution of the process for extracting the set of straight lines having the smallest sum total of "deviations" as a new set of selected ruled-line projections according to the continuous dynamic programming, thereby extracting the set of selected ruled-line projections when a decrease of the sum total of "deviations" is settled as the set of ruled line projections, and stores the result in the iteration-ruled-line-candidate-projection-set storage unit 22g.

That is, as shown in (d) in FIG. 11B, a process for calculating a "deviation": d(k−1:1) to d(k−1:U×D) for each ruled-line candidate projection based on the "cross ratio vector of the ruled-line candidate projection" and the [set of selected ruled-line projections (k−1): the sum total of "deviations" being E(k−1)], and a process for extracting a new set of selected ruled-line projections (k): the sum total of "deviations" being E(k) according to the continuous dynamic programming are repeatedly executed. For example, when a decreasing rate of E(k−1) and E(k), "(E(k−1)−E(k))/E(k−1)", is smaller than a predetermined value (for example, 0.1%), it is regarded that a decrease of the sum total of deviations is settled, to extract the set (k) of selected ruled-line projections as the set of ruled line projections (see (e) in FIG. 11B).

Figure 13:
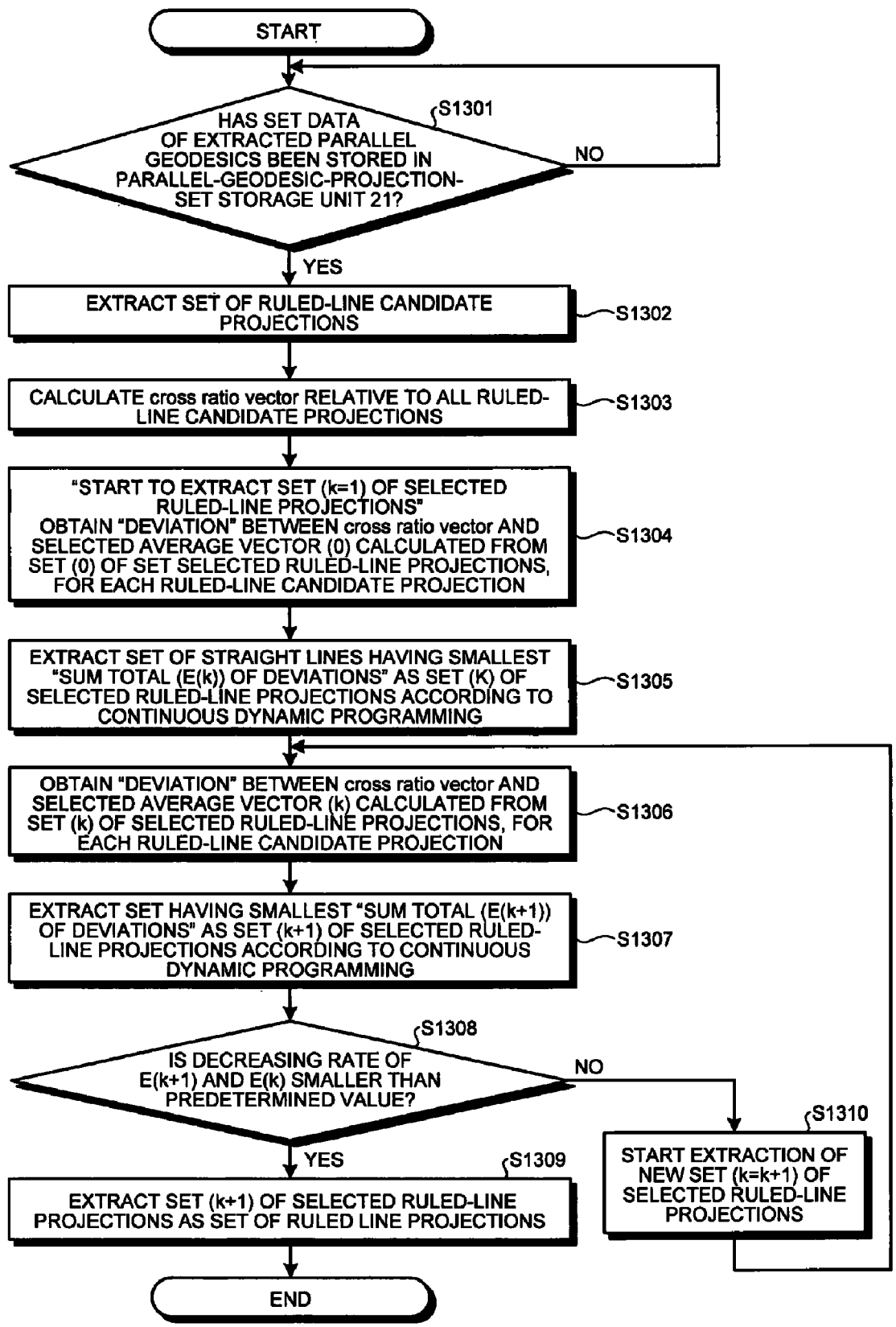
FIG. 13 is a flowchart for explaining a process procedure performed by the ruled-line-projection extracting apparatus according to the second embodiment.

A process performed by the ruled-line-projection extracting apparatus according to the second embodiment is explained with reference to FIG. 13. FIG. 13 is a flowchart of the process procedure performed by the ruled-line-projection extracting apparatus according to the second embodiment.

At first, in the ruled-line-projection extracting apparatus 100 according to the second embodiment, when set data of extracted parallel geodesics is stored in the parallel-geodesic-projection-set storage unit 21 (YES at step S1301), as in the first embodiment, the ruled-line candidate projection extractor 32a extracts the set of straight lines that associate the top parallel geodesic projection positioned at the upper end with the bottom parallel geodesic projection positioned at the lower end in the set of parallel geodesic projections, as the set of ruled-line candidate projections, which is a search target of the set of ruled line projections (step S1302), for example, as shown in (a) in FIG. 8.

Subsequently, the ruled-line-candidate-projection vector calculator 32d calculates the cross ratio vector of the ruled-line candidate projection for each ruled-line candidate projection (step S1303). That is, as shown in (a) in FIG. 11A, the ruled-line-candidate-projection vector calculator 32d calculates U(ab), which is the cross ratio vector of the ruled-line candidate projection "ab" by using the numerical expression shown in (d) in FIG. 3B, and repeats this calculation relative to each of U×D ruled-line candidate projections.

The deviation calculator 32e calculates a deviation, which is a distance between the cross ratio vector of the ruled-line candidate projection and a selected average vector, which is an average of the cross ratio vectors of the respective selected ruled-line projections in the set of selected ruled-line projections optionally selected as the set of ruled line projections, for each ruled-line candidate projection (step S1304). For example, as shown in (b) in FIG. 11A, the deviation calculator 32e selects a set of Ns straight lines that cut the top parallel geodesic projection and the bottom parallel geodesic projection with equal intervals, as a set (0) of selected ruled-line projections, and calculates a "deviation", which is the distance between the selected average vector (0) calculated based on the set (0) of selected ruled-line projections and the cross ratio vector of ruled-line candidate projections for each ruled-line candidate projection, as shown in the table of (c) in FIG. 11A.

Thereafter, the selected ruled-line-projection extractor 32f extracts a set of straight lines having the smallest sum total of "deviations" as a set of newly selected ruled-line projections, in the sets of straight lines that do not intersect with each other among the sets of the ruled-line candidate projections, according to the continuous dynamic programming (step S1305). That is, as shown in (c) in FIG. 11A, in (Ns) sets of straight lines that do not intersect with each other among the sets of the ruled-line candidate projections, a set of straight lines having the smallest sum total of "deviations" calculated according to the numerical expression shown in (e) in FIG. 3B is extracted as new [set (1) of the selected ruled-line projections: the sum total of "deviations" being E(1)], according to the continuous dynamic programming.

Subsequently, the iteration ruled-line-projection extractor 32g allows the deviation calculator 32e to (repeatedly) execute the process for calculating the "deviation" based on the "cross ratio vector of the ruled-line candidate projection" held in the ruled-line-candidate-projection-vector storage unit 22d and the "set of selected ruled-line projections" newly stored in the selected-ruled-line-projection-set storage unit 22f (step S1306), and the selected ruled-line-projection extractor 32f to (repeatedly) execute the process for extracting the set of straight lines having the smallest sum total of "deviations" as a new set of selected ruled-line projections according to the continuous dynamic programming (step S1307). When a decrease of the sum total of "deviations" is settled (YES at step S1308), the iteration ruled-line-projection extractor 32g extracts the set of selected ruled-line projections as the set of ruled line projections (step S1309), to finish the process.

That is, the process for calculating a "deviation": d(1:1) to d(1:U×D) (step S1306) for each ruled-line candidate projection based on the "cross ratio vector of the ruled-line candidate projection" and the [set (1) of selected ruled-line projections: the sum total of "deviations" being E(1)], and the process for extracting a new [set (2) of selected ruled-line projections: the sum total of "deviations" being E(2)] based on the calculation result are executed. When a decreasing rate of E(1) and E(2), "(E(1)−E(2))/E(1)", is smaller than a predetermined value (for example, 0.1%) (step S1308), the iteration ruled-line-projection extractor 32g regards as a decrease of the sum total of deviations being settled, to extract the set (1) of selected ruled-line projections as the set of ruled line projections (step S1309), to finish the process.

On the contrary, when the decreasing rate "(E(1)−E(2))/E(1)" shows a value equal to or larger than the predetermined value (for example, 0.1%) (NO at step S1308), extraction of a new set of selected ruled-line projections is started (step S1310), and step S1306 and step S1307 are repeatedly executed until the determination result at step S1308 becomes YES.

According to the second embodiment, a set of straight lines that associate the top parallel geodesic projection positioned at the upper end with the bottom parallel geodesic projection positioned at the lower end is extracted among the sets of parallel geodesic projections, as a set of ruled-line candidate projections, which is a search target of a set of ruled line projections. The cross ratio vector of the extracted ruled-line candidate projections is calculated for each ruled-line candidate projection, thereby calculating a "deviation", which is a distance between the cross ratio vector of the ruled-line candidate projection and a selected average vector, which is an average of the cross ratio vectors of the respective sets of selected ruled-line projections optionally selected as the set of ruled line projections, for each ruled-line candidate projection. A set of straight lines having the smallest sum total of deviations is extracted as a new set of selected ruled-line projections, in the set of straight lines that do not intersect with each other among the sets of ruled-line candidate projections, according to the continuous dynamic programming. The process for calculating a "deviation" based on the cross ratio vector of the ruled-line candidate projection and the newly extracted set of selected ruled-line projections, and the process for extracting a set of straight lines having the smallest sum total of "deviations" as a new set of selected ruled-line projections are then repeatedly executed, thereby extracting a set of selected ruled-line projections when a decrease of the sum total of "deviations" is settled as the set of ruled line projections. Accordingly, the set of ruled line projections formed of an optimum combination can be repeatedly extracted with a smaller calculation amount, as compared to a case that evaluation as the ruled line projection is performed relative to all combinations selected from the set of ruled-line candidate projections, and therefore the highly accurate and stable set of ruled line projections can be extracted from an image obtained by imaging a paper curved surface, which is a distorted sheet of paper, thereby enabling correction of paper distortion highly accurately and stably.

In the first and second embodiments, a case that ruled line projections are extracted, designating a three-dimensional paper curved surface as a ruled surface has been explained. In the third embodiment, a ruled-line-projection extracting apparatus that extracts ruled line projections, limiting the three-dimensional paper curved surface to a curved surface by a generalized conic model, which is a low order category of the ruled surface is explained.

Figure 14:
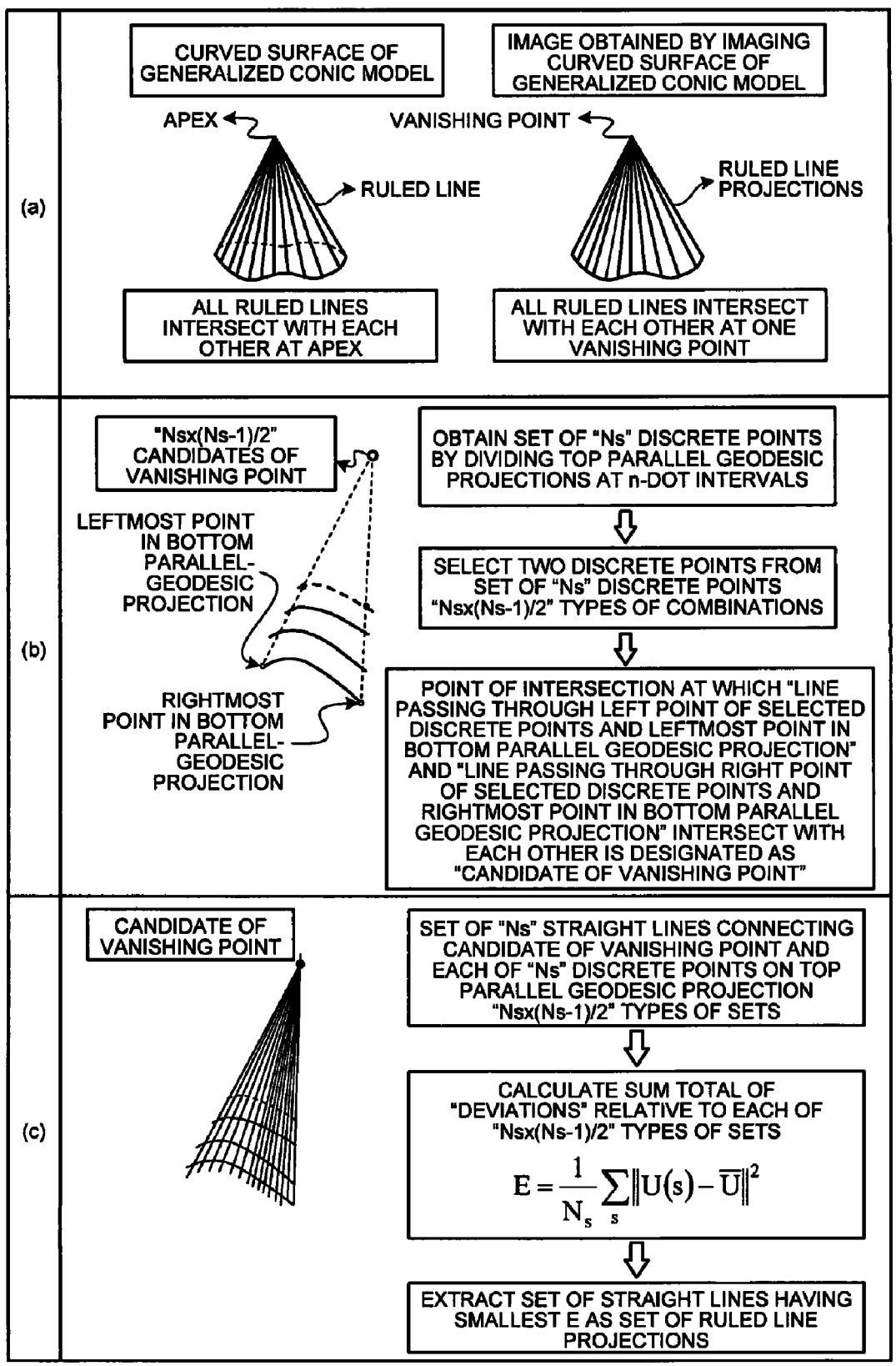
FIG. 14 is a schematic for explaining an outline and characteristics of a ruled-line-projection extracting apparatus according to a third embodiment of the present invention.

The primary characteristic of the ruled-line-projection extracting apparatus according to the third embodiment is specifically explained with reference to FIG. 14. FIG. 14 is a schematic for explaining an outline and characteristics of the ruled-line-projection extracting apparatus according to the third embodiment.

The ruled-line-projection extracting apparatus according to the third embodiment limits the three-dimensional paper curved surface to a curved surface by the generalized conic model, which is a low order category of the ruled surface, and uses such a condition that in an image obtained by imaging the curved surface by the generalized conic model, all ruled line projections intersect with each other at one vanishing point, thereby extracting a set of ruled line projections by checking the set of straight lines radially extended toward a set of parallel geodesic projections for each vanishing point candidate, which is an optionally set candidate of vanishing point.

A generalized cone stands for a cone in which a bottom thereof is generalized to an optional shape, which is not limited to a circle, as shown in the left of (a) in FIG. 14. On a curved surface by the generalized conic model, all ruled lines intersect with each other at an apex. As shown in the right of (a) in FIG. 14, in an image obtained by imaging the curved surface by the generalized conic model, all of the ruled line projections intersect with each other at one vanishing point.

In other words, if the three-dimensional paper curved surface is limited to the curved surface by the generalized conic model, in addition to the condition that "the interior division ratio determined from the ratio of segment lengths obtained by dividing respective ruled line projections by the set of parallel geodesic projections is constant", the set of ruled line projections can be extracted further by using a condition that "all of the ruled line projections intersect with each other at one vanishing point".

For example, as shown in (b) in FIG. 14, a vanishing point candidate is set. At first, by dividing the top parallel geodesic projection at n-dot intervals, set of "Ns" discrete points are obtained. Two discrete points ("(Ns×(Ns−1)/2" kinds of combinations) are selected from the set of "Ns" discrete points. Subsequently, a point of intersection at which a "line passing through the left point of the selected discrete points and the leftmost point in the bottom parallel geodesic projection" and a "line passing through the right point of the selected discrete points and the rightmost point in the bottom parallel geodesic projection" intersect with each other is designated as a "candidate of vanishing point". Accordingly, "(Nsx(Ns−1)/2 candidates of vanishing point" are set. Further, as shown in (c) in FIG. 14, a set of "Ns" straight lines, which respectively connect the vanishing point candidate and the "Ns" discrete points on the top parallel geodesic, is extracted.

As shown in (c) in FIG. 14, respective cross ratio vectors of the "Ns" straight lines are calculated by using the equation shown in (d) in FIG. 3B, relative to each set of extracted straight lines, thereby calculating an average vector in the calculated set of "Ns" straight lines. These values are assigned to the equation shown in (e) in FIG. 3B, to calculate the [sum total of "deviations": E] included in the set of straight lines.

A set of straight lines having the smallest E among the [sum total of "deviations": E] included in the "(Nsx(Ns−1)/2" sets of straight lines determined for each "vanishing point candidate" is extracted as the set of rules line projections.

Accordingly, the ruled-line-projection extracting apparatus according to the third embodiment can extract the set of ruled line projections with a small calculation amount, by limiting the search range of ruled line projections from multi-dimensions to two dimensions, to extract a highly accurate and stable set of ruled line projections from an image obtained by imaging the paper curved surface, which is a distorted sheet of paper, thereby enabling distortion correction of the paper highly accurately and stably.

Figure 15:
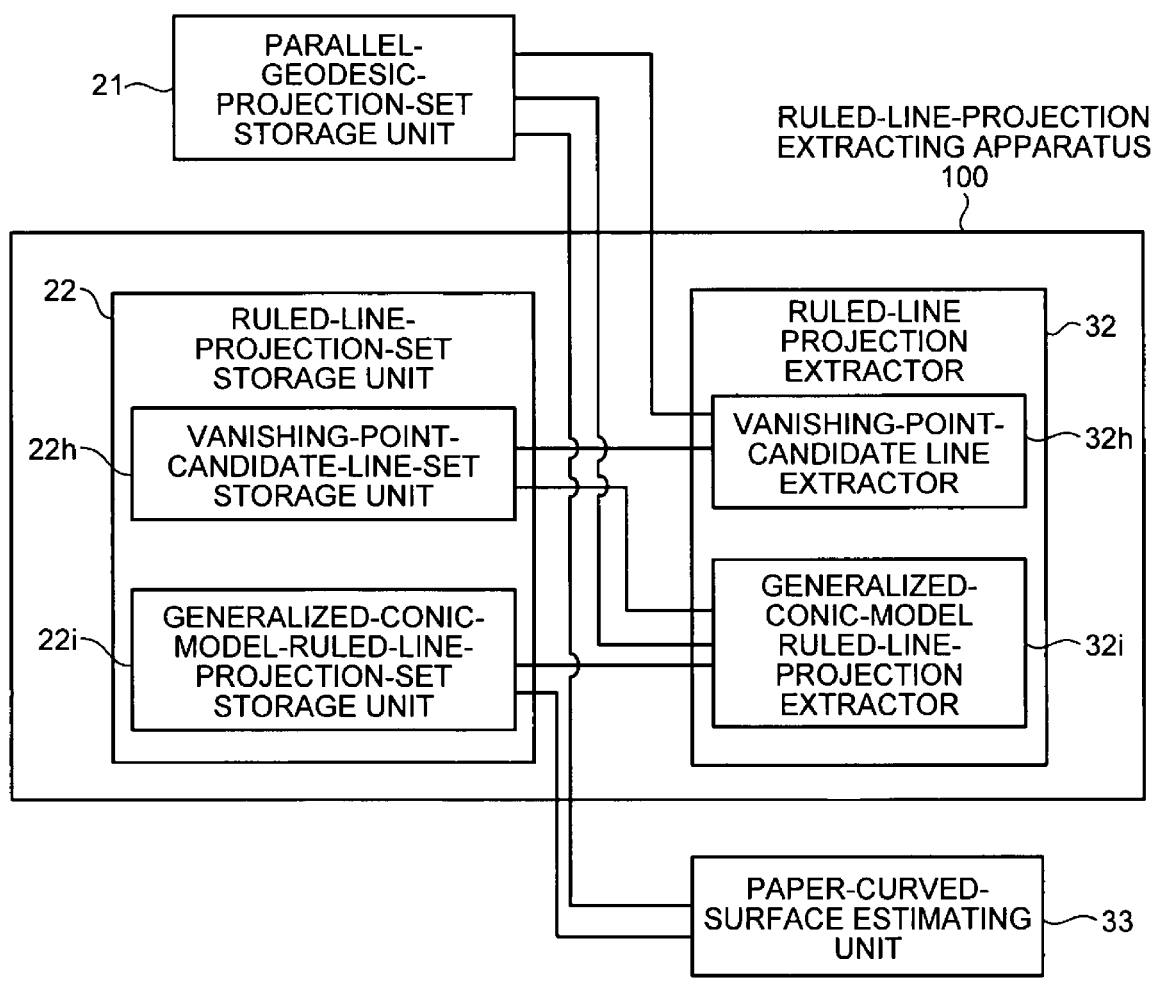
FIG. 15 is a block diagram of the ruled-line-projection extracting apparatus according to the third embodiment.

The ruled-line-projection extracting apparatus according to the third embodiment is explained with reference to FIG. 15. FIG. 15 is a block diagram of the configuration of the ruled-line-projection extracting apparatus according to the third embodiment.

As shown in FIG. 15, the ruled-line-projection extracting apparatus 100 according to the third embodiment is formed of the ruled-line projection extractor 32 in the image-distortion correcting apparatus 10 and the ruled-line-projection-set storage unit 22, as in the first and second embodiments, and extracts the ruled line projection based on the set of parallel geodesic projections stored in the parallel-geodesic-projection-set storage unit 21. The paper-curved-surface estimating unit 33 estimates the three-dimensional paper curved surface based on the result.

The ruled-line-projection-set storage unit 22 stores therein results of various types of processing performed by the ruled-line projection extractor 32 and includes, as shown in FIG. 15, a vanishing-point-candidate-line-set storage unit 22h, and a generalized-conic-model-ruled-line-projection-set storage unit 22i as parts closely related to the present invention. The vanishing-point-candidate-line-set storage unit 22h stores therein the set of straight lines for each vanishing point candidate extracted by a vanishing-point-candidate line extractor 32h, and the generalized-conic-model-ruled-line-projection-set storage unit 22i stores therein a set of ruled line projections extracted by a generalized-conic-model ruled-line-projection extractor 32i.

The ruled-line projection extractor 32 executes various types of processing based on the set of parallel geodesic projections stored in the parallel-geodesic-projection-set storage unit 21 and includes, as shown in FIG. 15, the vanishing-point-candidate line extractor 32h and the generalized-conic-model ruled-line-projection extractor 32i, as the parts closely related to the present invention. The vanishing-point-candidate line extractor 32h and the generalized-conic-model ruled-line-projection extractor 32i correspond to "extracting (of generalized-conic-model ruled-line projections)" described in the appended claims. Respective parts will be described later in detail.

The vanishing-point-candidate line extractor 32h limits the three-dimensional paper curved surface to a curved surface by the generalized conic model, which is a low order category of the ruled surface, uses such a condition that in an image obtained by imaging the curved surface by the generalized conic model, all ruled line projections intersect with each other at one vanishing point, and sets the vanishing point candidate, to extract a set of straight lines radially extended toward a set of parallel geodesic projections for each vanishing point candidate, the result of which is stored in the vanishing-point-candidate-line-set storage unit 22h.

For example, as shown in (b) in FIG. 14, a point of intersection determined by the set of "Ns" discrete points in the top parallel geodesic projection and the "leftmost point and the rightmost point on the bottom parallel geodesic projection" is designated as a "candidate of vanishing point", and as shown in (c) in FIG. 14, sets of "Ns" straight lines respectively connecting the candidate of vanishing point and the "Ns" discrete points in the top parallel geodesic projection are extracted for the number of "Nsx(Ns−1)/2".

The generalized-conic-model ruled-line-projection extractor 32i extracts the set of ruled line projections by checking the extracted set of straight lines, and stores the result in the generalized-conic-model ruled-line-projection extractor 32i. That is, as shown in (c) in FIG. 14, the [sum total of "deviations": E] obtained from the equation shown in (e) in FIG. 3B is calculated, to extract the set of straight lines having the smallest E as the set of ruled line projections.

Figure 16:
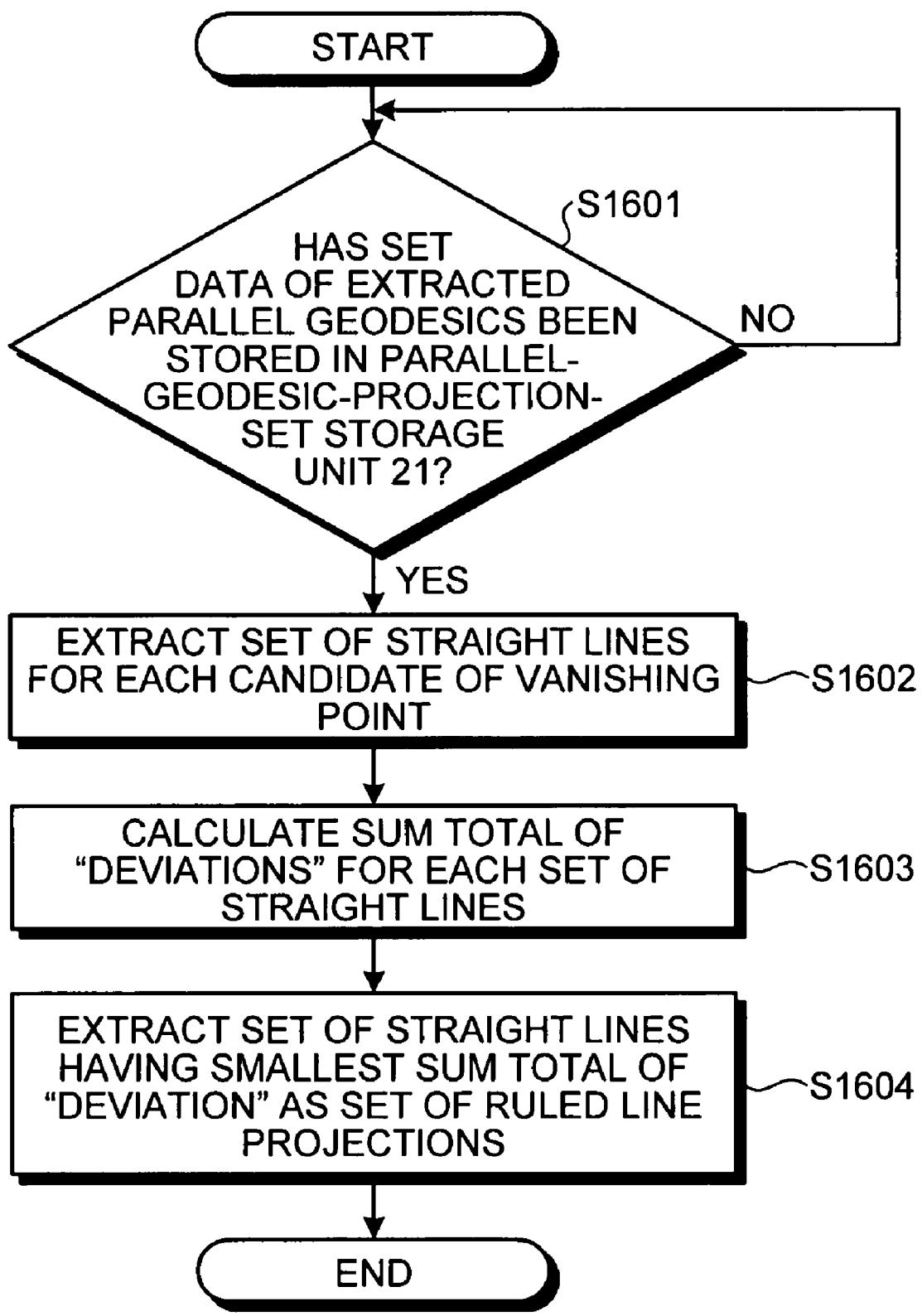
FIG. 16 is a flowchart for explaining a process procedure performed by the ruled-line-projection extracting apparatus according to the third embodiment.

A process performed by the ruled-line-projection extracting apparatus 100 according to the third embodiment is explained with reference to FIG. 16. FIG. 16 is a flowchart of the process procedure performed by the ruled-line-projection extracting apparatus according to the third embodiment.

At first, in the ruled-line-projection extracting apparatus 100 according to the third embodiment, when set data of extracted parallel geodesics is stored in the parallel-geodesic-projection-set storage unit 21 (YES at step S1601), as in the first embodiment, the vanishing-point-candidate line extractor 32h limits the three-dimensional paper curved surface to a curved surface by the generalized conic model, which is a low order category of the ruled surface, uses such a condition that in the image obtained by imaging the curved surface by the generalized conic model, all ruled line projections intersect with each other at one vanishing point, and sets the vanishing point candidate, to extract a set of straight lines radially extended toward the set of parallel geodesic projections for each vanishing point candidate (step S1602). For example, as shown in (c) in FIG. 14, "Nsx(Ns−1)/2" sets of "Ns" straight lines respectively connecting the candidate of vanishing point and each of the "Ns" discrete points on the top parallel geodesic projection are extracted.

The generalized-conic-model ruled-line-projection extractor 32i then calculates the [sum total of "deviations": E] obtained from the equation shown in (e) in FIG. 3B for each extracted sets of straight lines (step S1603).

Thereafter, the generalized-conic-model ruled-line-projection extractor 32i extracts the set of straight lines having the smallest [sum total of "deviations": E] as the set of ruled line projections (step S1604), to finish the process.

According to the third embodiment, the three-dimensional paper curved surface is limited to the curved surface by the generalized conic model, which is the low order category of the ruled surface, the condition that in the image obtained by imaging the curved surface by the generalized conic model, all ruled line projections intersect with each other at one vanishing point is used, to check the set of straight lines radially extended toward the set of parallel geodesic projections for each vanishing point candidate, which is an optionally set candidate of vanishing point, thereby extracting a set of ruled line projections. Accordingly, the set of ruled line projections can be extracted with a small calculation amount by limiting the search range of ruled line projections from multi-dimensions to two dimensions, to extract a highly accurate and stable set of ruled line projections from an image obtained by imaging the paper curved surface, which is a distorted sheet of paper, thereby enabling distortion correction of the paper highly accurately and stably.

In the first to third embodiments, a case that the ruled line projections are extracted by designating straight lines that intersect with all the parallel geodesic projections as the search target has been explained. In the fourth embodiment, a ruled-line-projection extracting apparatus that extracts the ruled line projections by designating straight lines that do not intersect with all the parallel geodesic projections also as the search target is explained.

Figure 17A:
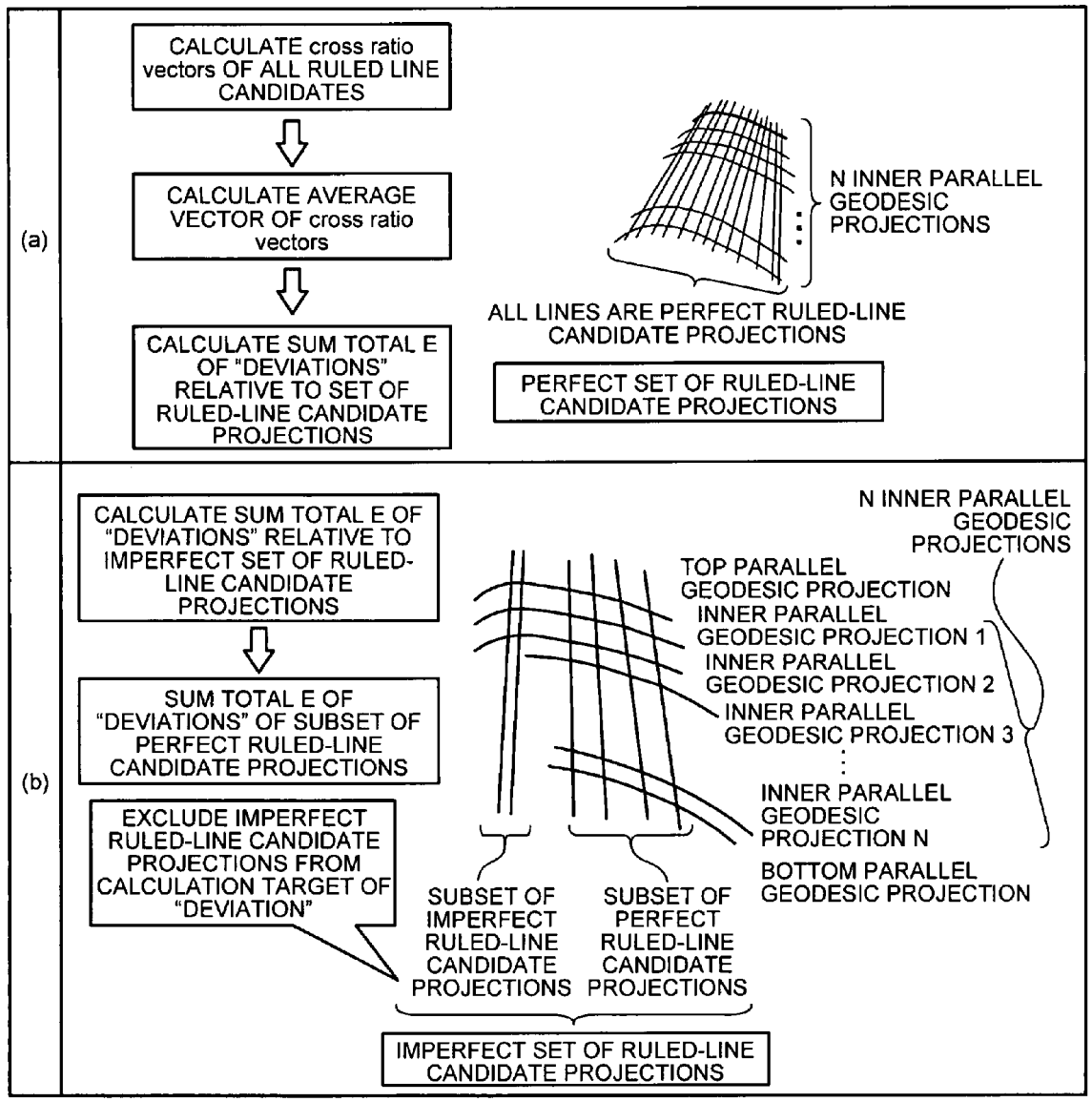
FIG. 17A is a schematic for explaining an outline and characteristics of a ruled-line-projection extracting apparatus according to a fourth embodiment of the present invention.
Figure 17B:
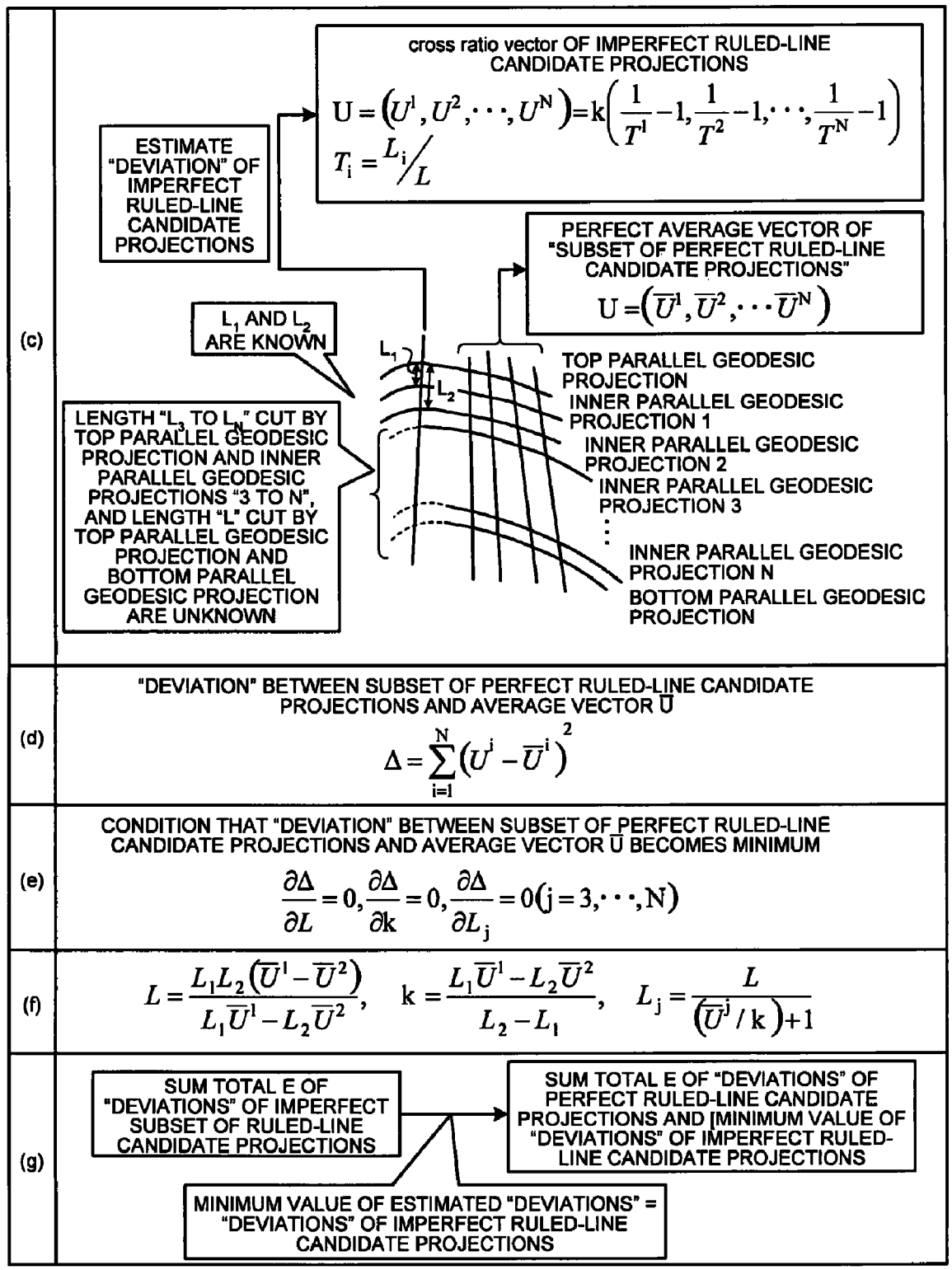
FIG. 17B is another schematic for explaining an outline and characteristics of the ruled-line-projection extracting apparatus according to the fourth embodiment.

The primary characteristic of the ruled-line-projection extracting apparatus according to the fourth embodiment is specifically explained with reference to FIGS. 17A and 17B. FIGS. 17A and 17B are explanatory diagrams of an outline and characteristics of the ruled-line-projection extracting apparatus according to the fourth embodiment.

The ruled-line-projection extracting apparatuses according to the first to third embodiments evaluate a deviation from a condition as the set of ruled line projections, only for a "perfect set of ruled-line candidate projections" formed of only the "perfect ruled-line candidate projections", which are ruled-line candidate projections that intersect with all the sets of parallel geodesic projections, as shown in (a) in FIG. 17A. In the ruled-line-projection extracting apparatus according to the fourth embodiment, however, a deviation from the condition as the set of ruled line projections is evaluated, for an imperfect set of ruled-line candidate projections including a subset of perfect ruled-line candidate projections, which are ruled-line candidate projections that intersect with all the sets of parallel geodesic projections, and a subset of imperfect ruled-line candidate projections, which are ruled-line candidate projections that intersect with only a partial set of parallel geodesic projections, among the sets of ruled-line candidate projections as the search target of the set of ruled line projections.

For example, in the set of straight lines, which are the ruled-line candidate projections extracted for each vanishing point candidate shown in (c) in FIG. 14, there is a possibility that the "imperfect set of ruled-line candidate projections" as shown in (b) in FIG. 17A is present. That is, in the "imperfect set of ruled-line candidate projections" shown in (b) in FIG. 17A, a ["subset" of "two imperfect ruled-line candidate projections"], which intersect with the top parallel geodesic projection and two inner parallel geodesic projections 1 and 2, but do not intersect with other inner parallel geodesic projections (N–2) and the bottom parallel geodesic projection, are mixed with a ["subset" of "perfect ruled-line candidate projections"]. According to the conventional method, the sum total of the deviations included in the "imperfect set of ruled-line candidate projections" cannot be calculated relative to all the ruled-line candidate projections, and can be calculated only from the cross ratio vector of the ["subset" of "perfect ruled-line candidate projections"] excluding the ["subset" of "imperfect set of ruled-line candidate projections"] and the average vector.

The ruled-line-projection extracting apparatus according to the fourth embodiment, therefore, estimates a minimum value of deviation, which is a distance between an imperfect cross ratio vector determined based on an interior division ratio between the imperfect ruled-line candidate projections and a partial set of parallel geodesic projections, and an average perfect vector, which is an average of the cross ratio vectors of respective subsets of perfect ruled-line candidate projections to all sets of parallel geodesic projections, relative to all the imperfect ruled-line candidate projections for each imperfect set of ruled-line candidate projections. Specifically, a minimum value of deviation is estimated, which is a distance between the cross ratio vector "U" of "imperfect ruled-line candidate projections", which intersect with the top parallel geodesic projection and two inner parallel geodesic projections 1 and 2, but do not intersect with other inner parallel geodesic projections (N–2) and the bottom parallel geodesic projection, as shown in (c) in FIG. 17B, and a perfect average vector, which is an average vector of the ["subset" of "perfect ruled-line candidate projections"].

If it is assumed that a length obtained by cutting the ruled line projection by the top parallel geodesic projection and an inner parallel geodesic projection "i" is "$L_i$", and a length obtained by cutting the ruled line projection by the top parallel geodesic projection and the bottom parallel geodesic projection is "L", as shown in (c) in FIG. 17B, a relation between these lengths can be expressed as: "$T_i=L_i/L$". In the ["subset" of "perfect ruled-line candidate projections"], the perfect average vector, which is the average vector of the cross ratio vector of the "perfect ruled-line candidate projections", can be calculated and is a known value. Further, "$L_i$ and $L_2$" are known, but "$L_3$ to $L_N$" and "L" are unknown. Furthermore, a normalizing coefficient "k" for setting the length of "U" to "1" is unknown.

The "deviation", which is the distance between the cross ratio vector "U" of "imperfect ruled-line candidate projections" and the perfect average vector, which is the average vector of the ["subset" of "perfect ruled-line candidate projections"] can be expressed by an equation shown in (d) in FIG. 17B, and a condition satisfied by "$L_3$ to $L_N$", "L", and "k" in the case of the "deviation" being the minimum can be expressed by three types of equations shown in (e) in FIG. 17B. When these equations are solved, "$L_3$ to $L_N$", "L", and "k" in the case of the "deviation" being the minimum are obtained as equations shown in (f) in FIG. 17B, respectively. These values are assigned to an equation shown in (d) in FIG. 17B, to estimate the minimum value of the deviation.

The ruled-line-projection extracting apparatus according to the fourth embodiment assumes the estimated minimum value of deviation as a deviation, which is a distance between the imperfect cross ratio vector of imperfect ruled-line candidate projections and the average perfect vector, and calculates the sum total of the deviations of the imperfect set of ruled-line candidate projections by adding the estimated deviation to a deviation, which is the distance between the cross ratio vector in the ["subset" of the "perfect ruled-line candidate projections"] and the average perfect vector. Specifically, the [minimum value of "deviations"] of the imperfect ruled-line candidate projections estimated based on the conditional equation shown in (f) in FIG. 17B is assumed to be a "deviation" of the imperfect ruled-line candidate projections, and a value obtained by adding this "deviation" to the "deviation" of the "perfect ruled-line candidate projections" is calculated as the "sum total of deviations of an imperfect set of ruled-line candidate projections" (see (g) in FIG. 17B).

The ruled-line-projection extracting apparatus according to the fourth embodiment compares the sum total of deviations of the imperfect set of ruled-line candidate projections with the sum total of deviations between the perfect cross ratio vectors calculated from respective perfect sets of ruled-line candidate projections including only the perfect ruled-line candidate projections and the average perfect vector, to extract the set of ruled-line candidate projections having the smallest sum total of deviations as the set of ruled line projections. That is, the sum total of deviations of the "imperfect set of ruled-line candidate projections" shown in (b) in FIG. 17A is calculated by including not only the "perfect ruled-line candidate projections" but also the "imperfect ruled-line candidate projections", which is compared with the sum total of deviations of "perfect set of ruled-line candidate projections" as shown in (a) in FIG. 17A, to extract the set of ruled-line candidate projections having the smallest sum total of deviations as the set of ruled line projections.

Accordingly, the ruled-line-projection extracting apparatus according to the fourth embodiment can estimate a "deviation" even in a set including many imperfect ruled-line candidate projections, to perform evaluation as the ruled line projection. Therefore, the ruled-line-projection extracting apparatus according to the fourth embodiment can extract the set of ruled line projections with a small calculation amount by limiting the search range of ruled line projections from multi-dimensions to two dimensions, to extract a highly accurate and stable set of ruled line projections from an image obtained by imaging the paper curved surface, which is a distorted sheet of paper, thereby enabling distortion correction of the paper highly accurately and stably.

Figure 18:
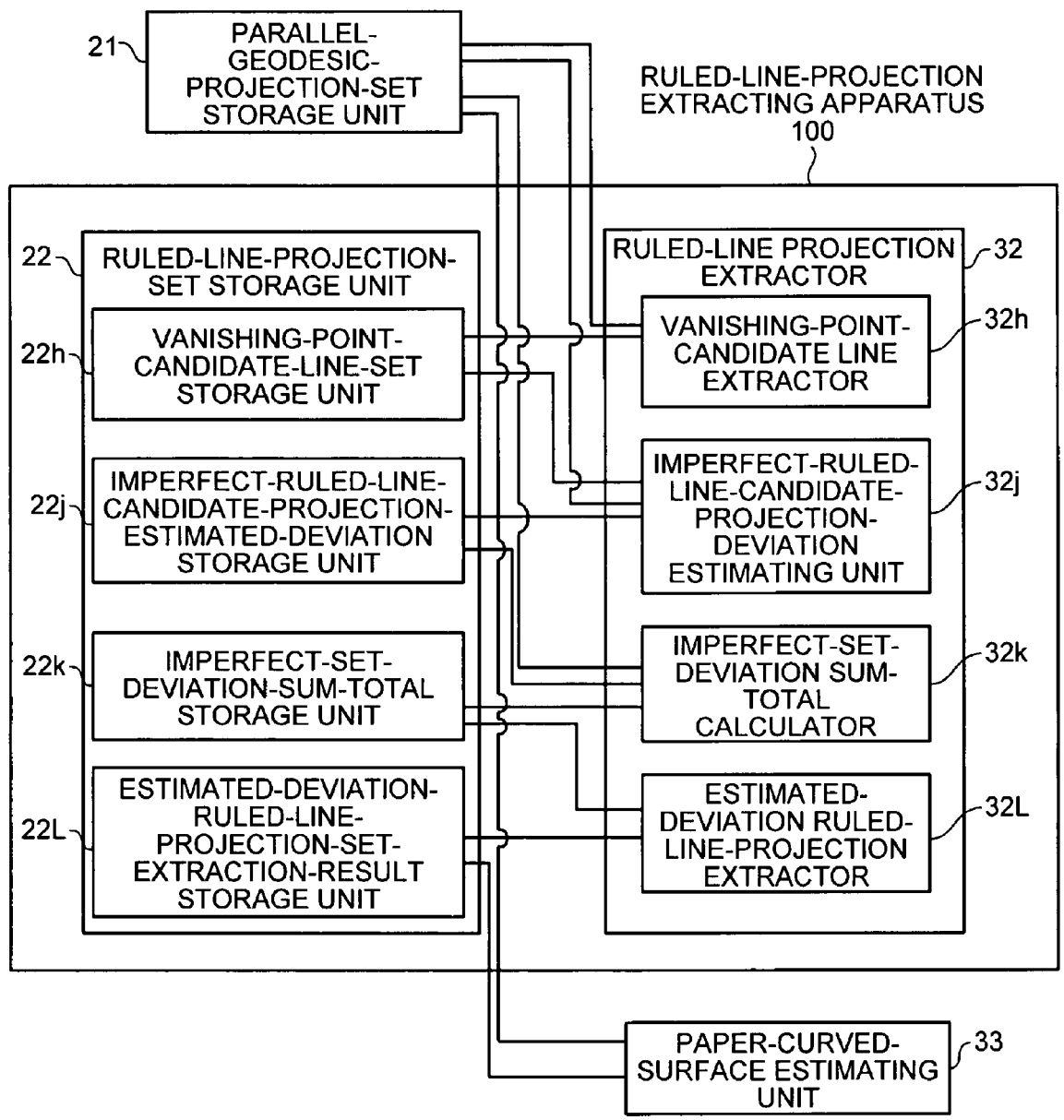
FIG. 18 is a block diagram of the ruled-line-projection extracting apparatus according to the fourth embodiment.

The ruled-line-projection extracting apparatus according to the fourth embodiment is explained with reference to FIG. 18. FIG. 18 is a block diagram of the configuration of the ruled-line-projection extracting apparatus according to the fourth embodiment.

As shown in FIG. 18, the ruled-line-projection extracting apparatus 100 according to the fourth embodiment is formed of the ruled-line projection extractor 32 in the image-distortion correcting apparatus 10 and the ruled-line-projection-set storage unit 22, as in the first to third embodiments, and extracts the ruled line projection based on the set of parallel geodesic projections stored in the parallel-geodesic-projection-set storage unit 21. The paper-curved-surface estimating unit 33 estimates the three-dimensional paper curved surface based on the result.

The ruled-line-projection-set storage unit 22 stores therein results of various types of processing performed by the ruled-line projection extractor 32 and includes, as shown in FIG. 18, the vanishing-point-candidate-line-set storage unit 22h, an imperfect-ruled-line-candidate-projection estimated-deviation storage unit 22j, an imperfect-set-deviation-sum-total storage unit 22k, and an estimated-deviation-ruled-line-projection-set-extraction-result storage unit 22L, as parts closely related to the present invention. The vanishing-point-candidate-line-set storage unit 22h stores therein the set of straight lines for each vanishing point candidate extracted by the vanishing-point-candidate-line extractor 32h. The imperfect-ruled-line-candidate-projection-estimated-deviation storage unit 22j stores therein the "minimum value of deviations" estimated by an imperfect-ruled-line-candidate-projection-deviation estimating unit 32j, and the imperfect-set-deviation-sum-total storage unit 22k stores therein the "sum total of deviations" calculated by an imperfect-set-deviation sum-total calculator 32k. The estimated-deviation-ruled-line-projection-set-extraction-result storage unit 22L stores therein the set of ruled line projections extracted by an estimated-deviation ruled-line-projection extractor 32L.

The ruled-line projection extractor 32 executes various types of processing based on the set of parallel geodesic projections-stored in the parallel-geodesic-projection-set storage unit 21 and includes, as shown in FIG. 18, the vanishing-point-candidate line extractor 32h, the imperfect-ruled-line-candidate-projection-deviation estimating unit 32j, the imperfect-set-deviation sum-total calculator 32k, and the estimated-deviation ruled-line-projection extractor 32L, as the parts closely related to the present invention. The imperfect-ruled-line-candidate-projection-deviation estimating unit 32j corresponds to "estimating (of imperfect ruled-line candidate projections)", the imperfect-set-deviation sum-total calculator 32k corresponds to "calculating (of sum total of deviations of the imperfect set)", and the estimated-deviation ruled-line-projection extractor 32L corresponds to "extracting of (estimated deviation ruled line projections)" described in the appended claims. Respective parts will be described later in detail.

The vanishing-point-candidate line extractor 32h limits the three-dimensional paper curved surface to the curved surface by the generalized conic model, which is the low order category of the ruled surface, as shown in FIG. 14, further uses the condition that in an image obtained by imaging the curved surface by the generalized conic model, all ruled line projections intersect with each other at one vanishing point, and sets the vanishing point candidate, to extract a set of straight lines radially extended toward a set of parallel geodesic projections for each vanishing point candidate, the result of which is stored in the vanishing-point-candidate-line-set storage unit 22h.

The imperfect-ruled-line-candidate-projection-deviation estimating unit 32j estimates a minimum value of deviation, which is a distance between an imperfect cross ratio vector determined based on an interior division ratio between the imperfect ruled-line candidate projections and a partial set of parallel geodesic projections, and an average perfect vector, which is an average of the cross ratio vectors of respective subsets of perfect ruled-line candidate projections to all sets of parallel geodesic projections, relative to all the imperfect ruled-line candidate projections for each imperfect set of ruled-line candidate projections. The result is stored in the imperfect-ruled-line-candidate-projection-estimated-deviation storage unit 22j.

For example, a minimum value of deviation is estimated, which is a distance between the cross ratio vector "U" of "imperfect ruled-line candidate projections", which intersect with the top parallel geodesic projection and two inner parallel geodesic projections 1 and 2, but do not intersect with other inner parallel geodesic projections (N−2) and the bottom parallel geodesic projection, as shown in (c) in FIG. 17B, and a perfect average vector (known value), which is an average vector of the ["subset" of "perfect ruled-line candidate projections"]. That is, it is when "$L_3$ to $L_N$", "L", and "k", which are unknown variables in "U" shown in (c) in FIG. 17B, satisfy the condition shown in (e) in FIG. 17B that the "deviation" between the cross ratio vector "U" of "imperfect ruled-line candidate projections" expressed in (d) in FIG. 17B and the perfect average vector becomes minimum. By solving this conditional equation, "$L_3$ to $L_N$", "L", and "k" in the case of the "deviation" being the minimum are obtained as equations shown in (f) in FIG. 17B, respectively. These values are assigned to the equation shown in (d) in FIG. 17B, to estimate the minimum value of the deviation.

The imperfect-set-deviation sum-total calculator 32k assumes the estimated minimum value of deviation as a deviation, which is a distance between the imperfect cross ratio vector of imperfect ruled-line candidate projections and the average perfect vector, and calculates the sum total of the deviations of the imperfect set of ruled-line candidate projections by adding the estimated deviation to a deviation, which is the distance between the cross ratio vector in the ["subset" of the "perfect ruled-line candidate projections"] and the average perfect vector.

Specifically, the [minimum value of "deviations"] of the imperfect ruled-line candidate projections estimated based on the conditional equation shown in (f) in FIG. 17B is assumed to be the "deviation" of the imperfect ruled-line candidate projections, and a value obtained by adding this "deviation" to the "deviation" of the "perfect ruled-line candidate projections" is calculated as the "sum total of deviations of an imperfect set of ruled-line candidate projections" (see (g) in FIG. 17B). The imperfect-set-deviation sum-total calculator $32k$ also calculates the sum total of "deviations" of the "perfect set of ruled-line candidate projections" by adding a "deviation" between the cross ratio vector for each perfect ruled-line projection candidate and the average perfect vector of the "perfect set of ruled-line projection candidates".

The estimated-deviation ruled-line-projection extractor $32L$ compares the sum total of deviations of the imperfect set of ruled-line candidate projections with the sum total of deviations between the perfect cross ratio vectors calculated from respective perfect sets of ruled-line candidate projections including only the perfect ruled-line candidate projections and the average perfect vector, to extract the set of ruled-line candidate projections having the smallest sum total of deviations as the set of ruled line projections. The result is stored in the estimated-deviation-ruled-line-projection-set-extraction-result storage unit $22L$. That is, the sum total of deviations of the "imperfect set of ruled-line projection candidates" shown in (b) in FIG. 17A is calculated by including not only the "perfect ruled-line candidate projections" but also the "imperfect ruled-line candidate projections", which is compared with the sum total of deviations of "perfect set of ruled-line projection candidates" as shown in (a) in FIG. 17A, to extract the set of ruled-line candidate projections having the smallest sum total of deviations as the set of ruled line projections.

Figure 19:
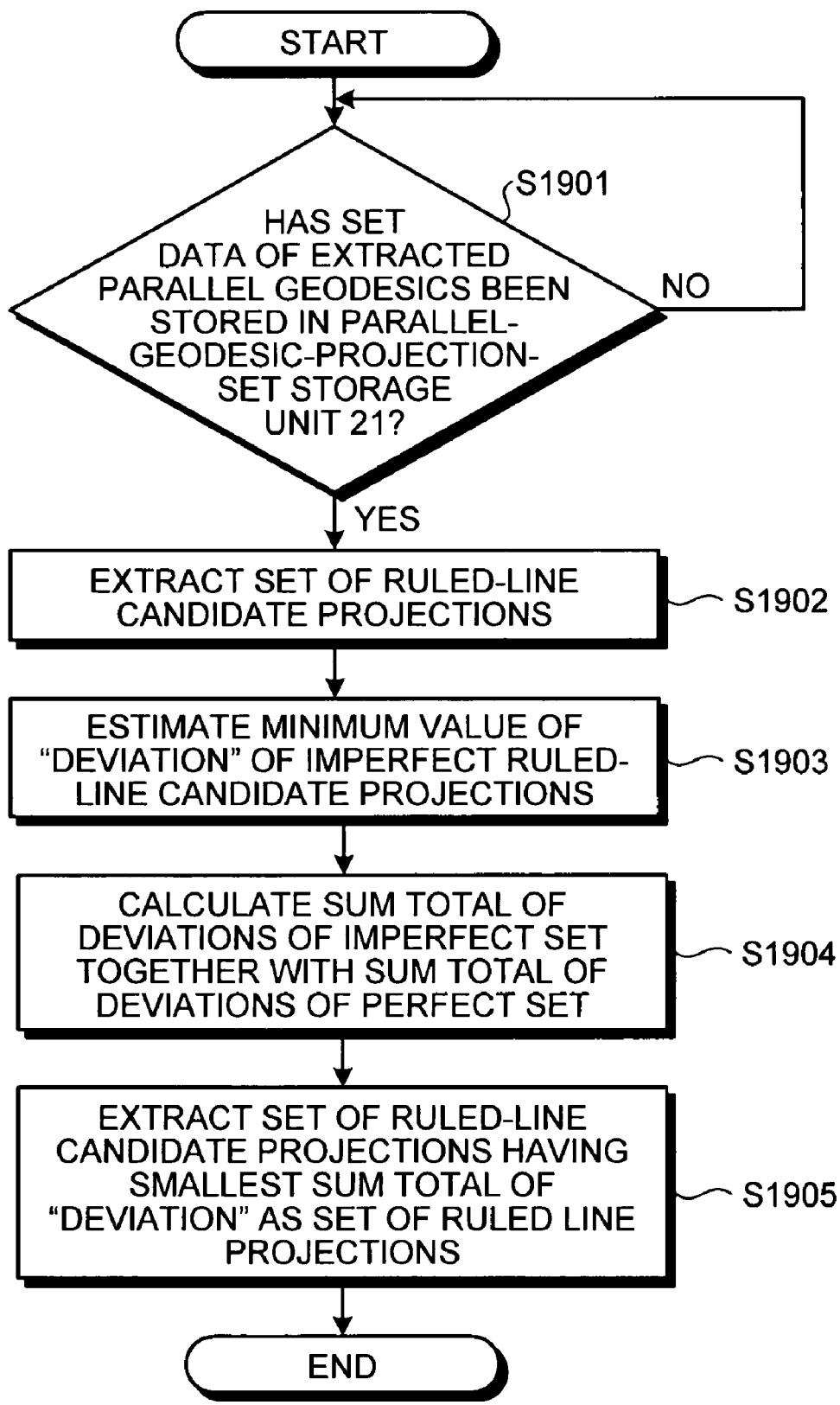
FIG. 19 is a flowchart for explaining a process procedure performed by the ruled-line-projection extracting apparatus according to the fourth embodiment.

A process performed by the ruled-line-projection extracting apparatus 100 according to the fourth embodiment is explained with reference to FIG. 19. FIG. 19 is a flowchart of the process procedure performed by the ruled-line-projection extracting apparatus according to the fourth embodiment.

At first, in the ruled-line-projection extracting apparatus 100 according to the fourth embodiment, when set data of extracted parallel geodesics is stored in the parallel-geodesic-projection-set storage unit 21 (YES at step S1901), a set of ruled-line candidate projections is extracted (step S1902). For example, as shown in FIG. 14, the three-dimensional paper curved surface is limited to a curved surface by the generalized conic model, which is the low order category of the ruled surface, such a condition that in the image obtained by imaging the curved surface by the generalized conic model, all ruled line projections intersect with each other at one vanishing point is used, to set the vanishing point candidate, and extract a set of straight lines radially extended toward the set of parallel geodesic projections for each vanishing point candidate.

The imperfect-ruled-line-candidate-projection-deviation estimating unit $32j$ then estimates a minimum value of deviation, which is a distance between an imperfect cross ratio vector determined based on an interior division ratio between the imperfect ruled-line candidate projections and a partial set of parallel geodesic projections, and an average perfect vector, which is an average of the cross ratio vectors of respective subsets of perfect ruled-line candidate projections to all sets of parallel geodesic projections, relative to all the imperfect ruled-line candidate projections for each imperfect set of ruled-line candidate projections (step S1903).

For example, a minimum value of deviation is estimated, which is a distance between the cross ratio vector "U" of "imperfect ruled-line candidate projections", which intersect with the top parallel geodesic projection and two inner parallel geodesic projections 1 and 2, but do not intersect with other inner parallel geodesic projections (N−2) and the bottom parallel geodesic projection, as shown in (c) in FIG. 17B, and a perfect average vector (known value), which is an average vector of the ["subset" of "perfect ruled-line candidate projections"], by using the condition shown in (e) in FIG. 17B.

Thereafter, the imperfect-set-deviation sum-total calculator $32k$ assumes the estimated minimum value of deviation as a deviation, which is a distance between the imperfect cross ratio vector of imperfect ruled-line candidate projections and the average perfect vector, and calculates the sum total of the deviations of the imperfect set of ruled-line candidate projections by adding the estimated deviation to a deviation, which is the distance between the cross ratio vector in the ["subset" of the "perfect ruled-line candidate projections"] and the average perfect vector. The imperfect-set-deviation sum-total calculator $32k$ also calculates the sum total of "deviations" of the "perfect set of ruled-line projection candidates" (step S1904).

Specifically, as shown in (g) in FIG. 17B, the imperfect-set-deviation sum-total calculator $32k$ assumes the estimated [minimum value of "deviation" of the imperfect ruled-line candidate projections as a "deviation" of the imperfect ruled-line candidate projections, and calculates the sum total of the deviations of the imperfect set of ruled-line candidate projections by adding the estimated deviation to the deviation of the "perfect ruled-line candidate projections". Further, the imperfect-set-deviation sum-total calculator $32k$ calculates the sum total of "deviations" of the "perfect set of ruled-line projection candidates" by adding a "deviation" between the cross ratio vector for each perfect ruled-line projection candidate and the average perfect vector of the "perfect set of ruled-line projection candidates".

The estimated-deviation ruled-line-projection extractor $32L$ compares the sum total of deviations of the imperfect set of ruled-line candidate projections with the sum total of deviations between the perfect cross ratio vectors calculated from respective perfect sets of ruled-line candidate projections including only the perfect ruled-line candidate projections and the average perfect vector, to extract the set of ruled-line candidate projections having the smallest sum total of deviations as the set of ruled line projections (step S1905), to finish the process. That is, the sum total of deviations of the "imperfect set of ruled-line projection candidates" shown in (b) in FIG. 17A is calculated by including not only the "perfect ruled-line candidate projections" but also the "imperfect ruled-line candidate projections", and the result is compared with the sum total of deviations of the "perfect set of ruled-line projection candidates" as shown in (a) in FIG. 17A, to extract the set of ruled-line candidate projections having the smallest sum total of deviations as the set of ruled line projections.

According to the fourth embodiment, a minimum value of deviation, which is a distance between the imperfect cross ratio vector of imperfect ruled-line candidate projections to a partial sets of parallel geodesics, and an average perfect vector, which is an average of the cross ratio vectors of the respective subsets of perfect ruled-line candidate projections to all sets of parallel geodesic projections, is estimated for all of the "imperfect ruled-line candidate projections", with regard to the "imperfect set of ruled-line candidate projections" including the ["subset" of "perfect ruled-line candidate projections"], which are the ruled-line candidate projections that intersect with all sets of parallel geodesic projections, and the ["subset" of "imperfect ruled-line candidate projections"], which are the ruled-line candidate projections that intersect with only a partial set of parallel geodesic projections, among the sets of ruled-line candidate projections as the search target of the set of ruled line projections. The estimated minimum value of deviation is assumed as a deviation, which is a distance between the imperfect cross ratio vector of imperfect ruled-line candidate projections and the average perfect vector, and the sum total of the deviations of the "imperfect set of ruled-line candidate projections" is calculated by adding the estimated deviation to a deviation, which is the distance between the cross ratio vector of the "perfect ruled-line candidate projections" and the average perfect vector. The calculated sum total of deviations of the "imperfect set of ruled-line candidate projections" is compared with the sum total of deviations between the perfect vectors calculated from respective perfect sets of ruled-line candidate projections including only the perfect ruled-line candidate projections and the average perfect vector, to extract the set of ruled-line candidate projections having the smallest sum total of deviations as the set of ruled line projections. Accordingly, evaluation as the ruled line projections can be performed by estimating a "deviation" even in a set including many imperfect ruled-line candidate projections, to extract a highly accurate and stable set of ruled line projections from an image obtained by imaging the paper curved surface, which is a distorted sheet of paper, thereby enabling distortion correction of the paper highly accurately and stably.

The ruled-line-projection extracting apparatuses according to the first to fourth embodiments have been explained above. However, the present invention can be executed in various different modes, other than the embodiments described above. Therefore, various different embodiments are divided into (1) to (6) and explained as the ruled-line-projection extracting apparatus according to the fifth embodiment.

(1) Ruled-line Candidate Projections

In the first and second embodiments, a case that a straight line of ruled-line candidate projection is extracted from the "set of discrete points on the top parallel geodesic projection" and the set of discrete points on the bottom parallel geodesic projection" has been explained. However, the present invention is not limited thereto, and is also applicable to a case that the straight line of ruled-line candidate projection is extracted from the "set of discrete points on the top parallel geodesic projection or on the bottom parallel geodesic projection" and an "inclination". Specifically, "U" sets of discrete points can be obtained in the top parallel geodesic projection by dividing the top parallel geodesic projection at P-dot intervals, to extract a set of straight lines (a set of U×D straight lines) extended from respective discrete points at "D types" of inclination as the set of ruled-line candidate projections.

(2) Set of Selected Ruled Line Projections

In the second embodiment, a case that a set of straight lines that cut the top parallel geodesic projection and the bottom parallel geodesic projection, respectively, at equal intervals is designated as the set (0) of initially selected ruled-line projections has been explained. However, the present invention is not limited thereto, and the set (0) of selected ruled-line projections can be in a case that the set of ruled line projections extracted by using the "deviation of neighborhood" in the first embodiment is employed, or in a case that the set of ruled line projections extracted by limiting the three-dimensional paper curved surface to the "curved surface by the generalized conic model" in the third embodiment is employed.

(3) "Candidate of Vanishing Point"

In the third and fourth embodiments, a case that a point of intersection of two straight lines determined from "two discrete points selected from discrete points on the top parallel geodesic projection" and the "rightmost and leftmost points on the bottom parallel geodesic projection" is designated as the "candidate of vanishing point" has been explained. However, the present invention is not limited thereto, and for example, a point of intersection of two straight lines determined from "two discrete points selected from discrete points on the bottom parallel geodesic projection" and the "rightmost and leftmost points on the top parallel geodesic projection" can be designated as the "candidate of vanishing point". Further, a point of intersection of two straight lines determined from "two discrete points selected from discrete points on the top parallel geodesic projection" and "two discrete points selected from discrete points on the bottom parallel geodesic projection" can be designated as the "candidate of vanishing point".

In the fourth embodiment, a case that a set of straight lines extracted from the "candidate of vanishing point" is extracted as the set of ruled-line candidate projections has been explained. However, the present invention is not limited thereto, and for example, the set of ruled-line candidate projections can be extracted by the method shown in the first to second embodiments.

(4) "Candidate of Vanishing Point" and "Set of Straight Lines"

In the third and fourth embodiments, a case that a set of straight lines connecting the "candidate of vanishing point" and "respective discrete points on the top parallel geodesic projection" is extracted has been explained. However, the present invention is not limited thereto, and for example, a set of "Ns" straight lines that equally divides an angle (interior angle) between two straight lines connecting the "candidate of vanishing point" and "rightmost and leftmost points on the top parallel geodesic projection or the bottom parallel geodesic projections" into "Ns" can be extracted.

(5) System Configuration or the Like

Among the respective processes explained in the embodiments, all or a part of the processing explained as being performed automatically can be performed manually (for example, the set (0) of selected ruled-line projections is generated subjectively by an operator, instead of generating the set automatically by a predetermined rule), or all or a part of the processing explained as being performed manually can be performed automatically in a known method. For example, the information including the processing procedure, the control procedure, specific names, and various kinds of data and parameters shown in the specification or in the drawings (for example, a predetermined value of the decreasing rate of step S1308 shown in FIG. 13) can be optionally changed, unless otherwise specified.

The respective constituents of the illustrated apparatus are functionally conceptual, and the physically same configuration is not always necessary. In other words, the specific mode of dispersion and integration of the apparatus (for example, the mode shown in FIG. 18) is not limited to the illustrated ones, and all or a part thereof can be functionally or physically dispersed or integrated in an optional unit, according to the various kinds of load and the status of use, such as an integration of the imperfect-ruled-line-candidate-projection-deviation estimating unit 32*j* and the imperfect-set-deviation sum-total calculator 32k. All or an optional part of the various processing functions performed by the apparatus can be realized by a central processing unit (CPU) or a program analyzed and executed by the CPU, or can be realized as hardware by the wired logic.

(6) Ruled-line-projection Extraction Program

Figure 20:
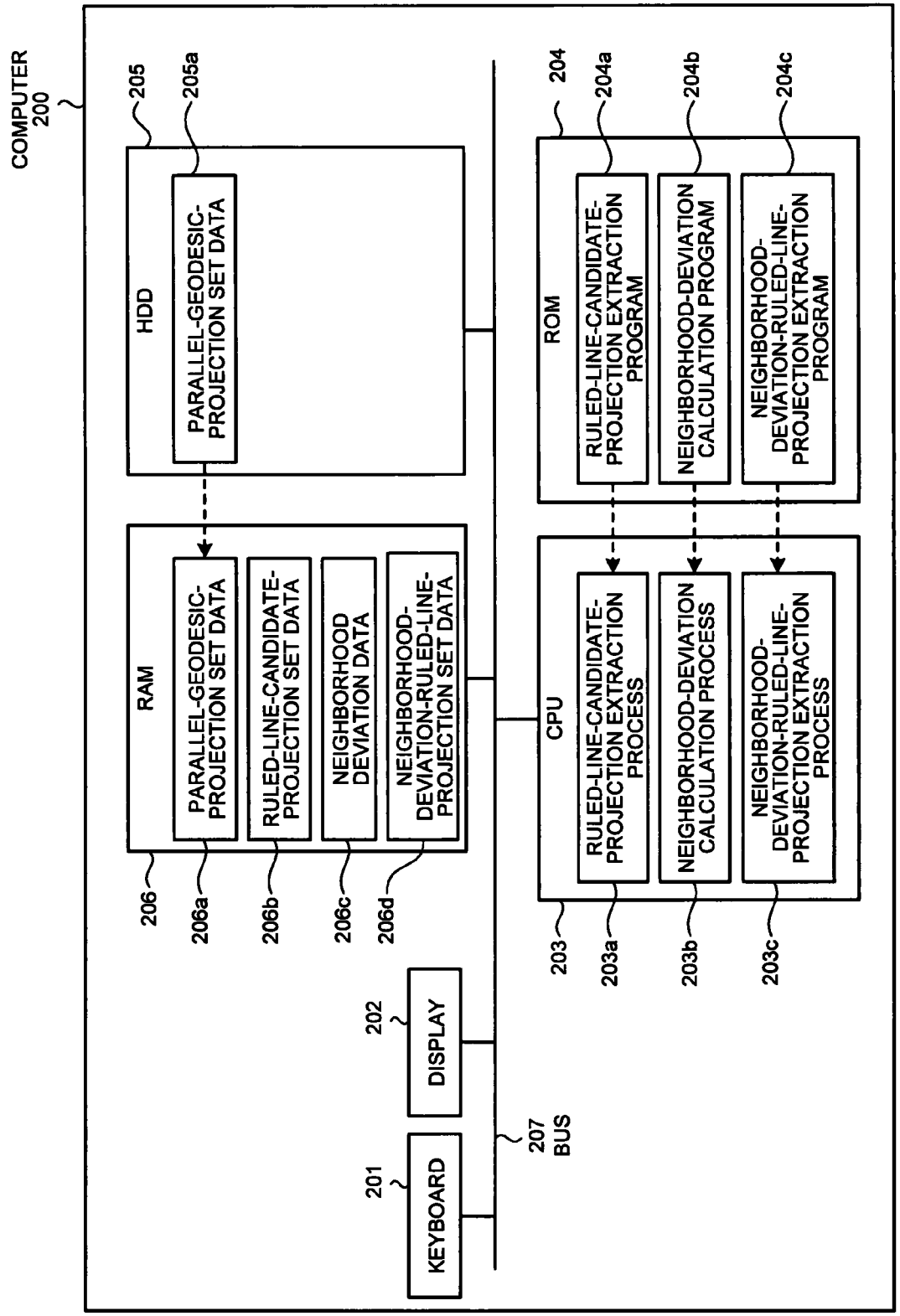
FIG. 20 depicts a computer that executes a ruled-line-projection extraction program according to the first embodiment.

In the first to fourth embodiments, a case that various types of processing are realized by hardware logic has been explained. However, the present invention is not limited thereto, and a prepared program can be executed by a computer. An example of a computer that executes a pursuit reliability determination program having the same function as that of the ruled-line-projection extracting apparatus 100 shown in the first embodiment is explained with reference to FIG. 20. FIG. 20 depicts a computer that executes the ruled-line-projection extraction program in the first embodiment.

As shown in FIG. 20, a computer 200 as an information processor is formed by connecting a keyboard 201, a display 202, a CPU 203, a read only memory (ROM) 204, a hard disk drive (HDD) 205, and a random access memory (RAM) 206 by a bus 207.

In the ROM 204, the ruled-line-projection extraction program that exhibits the same functions as those of the ruled-line-projection extracting apparatus 100 shown in the first embodiment, that is, as shown in FIG. 20, a ruled-line-candidate-projection extraction program 204a, a neighborhood-deviation calculation program 204b, and a neighborhood-deviation-ruled-line-projection extraction program 204c are stored beforehand. These programs 204a to 204c can be appropriately unified or dispersed, as in respective constituents of the ruled-line-projection extracting apparatus 100 shown in FIG. 9.

Since the CPU 203 reads these programs 204a to 204c from the ROM 204 and executes these programs, as shown in FIG. 20, respective programs 204a to 204c functions as a ruled-line-candidate-projection extraction process 203a, a neighborhood-deviation calculation process 203b, and a neighborhood-deviation-ruled-line-projection extraction process 203c. Respective processes 203a to 203c respectively correspond to the ruled-line-candidate projection extractor 32a, the neighborhood deviation calculator 32b, and the neighborhood-deviation-ruled-line projection extractor 32c shown in FIG. 9.

As shown in FIG. 20, parallel-geodesic-projection set data 205a is stored in the HDD 205. The parallel-geodesic-projection set data 205a corresponds to the parallel-geodesic-projection-set storage unit 21 shown in FIG. 9. The CPU 203 registers parallel-geodesic-projection set data 206a in the parallel-geodesic-projection set data 205a, reads and stores the parallel-geodesic-projection set data 206a in the RAM 206, and executes the ruled-line-projection extraction process based on the parallel-geodesic-projection set data 206a, ruled-line-candidate-projection set data 206b, neighborhood deviation data 206c, and neighborhood-deviation-ruled-line-projection set data 206d stored in the RAM 206. The ruled-line-candidate-projection set data 206b corresponds to the ruled-line-candidate-projection set the ruled-line-candidate-projection-set storage unit 22a, the neighborhood deviation data 206c corresponds to the neighborhood-deviation storage unit 22b, and the neighborhood-deviation-ruled-line-projection set data 206d corresponds to the neighborhood-deviation-ruled-line-projection-set storage unit 22c shown in FIG. 9.

The respective programs 204a to 204c need not be stored initially in the ROM 204, and respective programs can be stored, for example, in a "portable physical medium" such as a flexible disk (FD), a CD-ROM, a magneto-optical (MO) disk, a digital versatile disk (DVD), or IC card, or in a "fixed physical medium" such as an HDD provided inside or outside the computer 200, or in "other computers (or server)" connected to the computer 200 via a public line, the Internet, a local area network (LAN), or a wide area network (WAN), so that the computer 200 reads respective programs from the medium and executes the programs.

According to the present invention, a set of straight lines that associate the top parallel geodesic projection positioned at the upper end with the bottom parallel geodesic projection positioned at the lower end is extracted from the sets of parallel geodesic projections as the set of ruled-line candidate projections, which is a search target of the set of ruled line projections. The deviation of neighborhood, which is the distance between the vector determined based on the interior division ratio of the extracted ruled-line candidate projection and the vector determined based on the interior division ratio of the neighboring line obtained by shifting the ruled-line candidate projection by a predetermined interval is calculated for each of the ruled-line candidate projections. The deviation of neighborhood is stored and held for each ruled-line candidate projection. The set of straight lines having the smallest sum total of the held deviations of neighborhood is then extracted as the set of ruled line projections, in the sets of straight lines that do not intersect with each other among the sets of ruled-line candidate projections according to the continuous dynamic programming. Accordingly, the set of ruled line projections formed of an optimum combination can be extracted with a smaller calculation amount, as compared to a case that evaluation as the ruled line projection is performed relative to all combinations selected from the set of ruled-line candidate projections, and therefore the highly accurate and stable set of ruled line projections can be extracted from an image obtained by imaging a paper curved surface, which is a distorted sheet of paper, thereby enabling correction of paper distortion highly accurately and stably.

According to an aspect of the present invention, a set of straight lines that associate the top parallel geodesic projection positioned at the upper end with the bottom parallel geodesic projection positioned at the lower end is extracted among the sets of parallel geodesic projections, as a set of ruled-line candidate projections, which is the search target of the set of ruled line projections. A ruled-line-candidate projection vector, which is a vector determined based on the interior division ratio of the extracted ruled-line candidate projection is calculated for each ruled-line candidate projection. The calculated ruled-line-candidate projection vector is stored and held for each ruled-line candidate projection. A deviation, which is a distance between the held ruled-line-candidate projection vector and a selected average vector, which is an average of the vectors determined from the interior division ratio of the respective selected ruled-line projections of the sets of selected ruled-line projections optionally selected as the set of ruled line projections, is calculated for each ruled-line candidate projection. A set of straight lines having the smallest sum total of calculated deviations is extracted as a new set of selected ruled-line projections, in the set of straight lines that do not intersect with each other among the sets of ruled-line candidate projections, according to the continuous dynamic programming. The process for calculating a "deviation" based on the held ruled-line-candidate projection vector and the newly extracted set of selected ruled-line projections, and the process for extracting a new set of selected ruled-line projections are then repeatedly executed, thereby extracting a set of selected ruled-line projections when a decrease of the sum total of deviations is settled, as the set of ruled line projections. Accordingly, the set of ruled line projections formed of an optimum combination can be repeatedly extracted with a smaller calculation amount, as compared to a case that evaluation as the ruled line projection is performed relative to all combinations selected from the set of ruled-line candidate projections, and therefore the highly accurate and stable set of ruled line projections can be extracted from an image obtained by imaging a paper curved surface, which is a distorted sheet of paper, thereby enabling correction of paper distortion highly accurately and stably.

According to another aspect of the present invention, the three-dimensional paper curved surface is limited to the curved surface by the generalized conic model, which is the low order category of the ruled surface, the condition that in the image obtained by imaging the curved surface by the generalized conic model, all ruled line projections intersect with each other at one vanishing point is further used, to check the set of straight lines radially extended toward the set of parallel geodesic projections for each vanishing point candidate, which is an optionally set candidate of vanishing point, thereby extracting a set of ruled line projections. Accordingly, the set of ruled line projections can be extracted with a small calculation amount by limiting the search range of ruled line projections from multi-dimensions to two dimensions, to extract a highly accurate and stable set of ruled line projections from an image obtained by imaging the paper curved surface, which is a distorted sheet of paper, thereby enabling distortion correction of the paper highly accurately and stably.

According to still another aspect of the present invention, a minimum value of deviation, which is a distance between the imperfect vector, which is a vector determined based on an interior division ratio between the imperfect ruled-line candidate projections and a partial set of parallel geodesic projections, and an average perfect vector, which is an average of the perfect vectors, which are vectors determined from an interior division ratio between respective subsets of perfect ruled-line candidate projections and all sets of parallel geodesic projections, is estimated relative to all the imperfect ruled-line candidate projections for each imperfect set of ruled-line candidate projections, with regard to the imperfect set of ruled-line candidate projections including the subset of perfect ruled-line candidate projections, which are the ruled-line candidate projections that intersect with all sets of parallel geodesic projections, and the subset of imperfect ruled-line candidate projections, which are the ruled-line candidate projections that intersect with only a partial set of parallel geodesic projections, among the sets of ruled-line candidate projections as the search target of the set of ruled line projections. The estimated minimum value of deviation is assumed as a deviation, which is a distance between the imperfect vector of imperfect ruled-line candidate projections and the average perfect vector, and the sum total of deviations of the imperfect set of ruled-line candidate projections is calculated by adding the estimated deviation to a deviation, which is the distance between the perfect vector and the average perfect vector. The calculated sum total of deviations of the imperfect set of ruled-line candidate projections is compared with the sum total of deviations between the perfect vectors calculated from respective perfect sets of ruled-line candidate projections including only the perfect ruled-line candidate projections and the average perfect vector, to extract the set of ruled-line candidate projections having the smallest sum total of deviations as the set of ruled line projections. Accordingly, evaluation as the ruled line projections can be performed by estimating a "deviation" even in a set including many imperfect ruled-line candidate projections, to extract a highly accurate and stable set of ruled line projections from an image obtained by imaging the paper curved surface, which is a distorted sheet of paper, thereby enabling distortion correction of the paper highly accurately and stably.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable recording medium that stores therein a computer program that causes a computer to execute extracting a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the ruled line projections in which ruled lines, which are straight lines forming the three-dimensional paper curved surface, are projected on the image, respectively, by the set of parallel geodesic projections is constant, the computer program causing the computer to execute:

first extracting including extracting a set of straight lines that associate a top parallel geodesic projection positioned at an upper end with a bottom parallel geodesic projection positioned at a lower end, among the sets of parallel geodesic projections, as a set of ruled-line candidate projections as a search target of a set of ruled line projections;

calculating a deviation of neighborhood, which is a distance between a vector determined based on an interior division ratio of the ruled-line candidate projection extracted at the first extracting and a vector determined based on an interior division ratio of a neighboring line obtained by shifting the ruled-line candidate projection by a predetermined interval, for each of the ruled-line candidate projections;

storing and holding the deviation of neighborhood calculated at the calculating for each ruled-line candidate projection; and second extracting including extracting a set of straight lines having the smallest sum total of the deviations of neighborhood held at the storing and holding as a set of ruled line projections, in the sets of straight lines that do not intersect with each other among the sets of ruled-line candidate projections, according to continuous dynamic programming.

2. A computer-readable recording medium that stores therein a computer program that causes a computer to execute extracting a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the ruled line projections in which ruled lines, which are straight lines forming the three-dimensional paper curved surface, are projected on the image, respectively, by the set of parallel geodesic projections is constant, the computer program causing the computer to execute:

first extracting including extracting a set of straight lines that associate a top parallel geodesic projection positioned at an upper end with a bottom parallel geodesic projection positioned at a lower end, among the sets of parallel geodesic projections, as a set of ruled-line candidate projections as a search target of a set of ruled line projections;

first calculating including calculating a ruled-line-candidate projection vector, which is a vector determined based on an interior division ratio of the ruled-line candidate projections extracted at the first extracting, for each ruled-line candidate projection;

storing and holding the ruled-line-candidate projection vector calculated at the first calculating for each ruled-line candidate projection;

second calculating including calculating a deviation, which is a distance between the ruled-line-candidate projection vector held at the storing and holding and a selected average vector, which is an average of the vectors determined based on the interior division ratio of the respective ruled-line candidate projections in a set of selected ruled-line projections optionally selected as the set of ruled line projections, for each ruled-line candidate projection;

second extracting including extracting a set of straight lines having the smallest sum total of the deviations calculated at the second calculating as a new set of selected ruled-line projections, in the sets of straight lines that do not intersect with each other among the sets of ruled-line candidate projections, according to continuous dynamic programming; and third extracting including extracting the set of selected ruled-line projections when a decrease of sum total of the deviations is settled, as the set of ruled line projections, by repeatedly executing a process at the second calculating, using the ruled-line-candidate projection vector held at the storing and holding and the set of selected ruled-line projections newly extracted at the second extracting, and a process at the second extracting.

3. A computer-readable recording medium that stores therein a computer program that causes a computer to execute extracting a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the ruled line projections in which ruled lines, which are straight lines forming the three-dimensional paper curved surface, are projected on the image, respectively, by the set of parallel geodesic projections is constant, the computer program causing the computer to execute:

limiting the three-dimensional paper curved surface to a curved surface by a generalized conic model, which is a low order category of the ruled surface, using a condition that in an image obtained by imaging the curved surface by the generalized conic model, all ruled line projections intersect with each other at one vanishing point, and extracting a set of ruled line projections by checking a set of straight lines radially extended toward the set of parallel geodesic projections for each candidate of vanishing point, which is an optionally set candidate of vanishing point.

4. A computer-readable recording medium that stores therein a computer program that causes a computer to execute extracting a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the ruled line projections in which ruled lines, which are straight lines forming the three-dimensional paper curved surface, are projected on the image, respectively, by the set of parallel geodesic projections is constant, the computer program causing the computer to execute:

estimating a minimum value of deviation, which is a distance between an imperfect vector determined based on an interior division ratio between imperfect ruled-line candidate projections and a partial set of parallel geodesic projections, and an average perfect vector, which is an average of perfect vectors determined based on the interior division ratio between respective subsets of ruled-line candidate projections and all the set of parallel geodesic projections, relative to all the imperfect ruled-line candidate projections for each imperfect set of ruled-line candidate projections, with regard to imperfect sets of ruled-line candidate projections including a subset of perfect ruled-line candidate projections that intersect with all the set of parallel geodesic projections and a subset of imperfect ruled-line candidate projections that intersect with only a partial set of parallel geodesic projections among the set of ruled-line candidate projections, which is a search target of the set of ruled line projections;

calculating sum total of deviations of the imperfect set of ruled-line candidate projections by assuming the minimum value of deviation estimated at the estimating as a deviation, which is a distance between the imperfect vector of imperfect ruled-line candidate projections and the average perfect vector, and adding the estimated deviation to a deviation, which is a distance between the perfect vector and the average perfect vector; and extracting a set of ruled-line candidate projections having the smallest sum total of deviations as the set of ruled line projections, by comparing the sum total of deviations of the imperfect set of ruled-line candidate projections calculated at the calculating with the sum total of deviations between the perfect vectors calculated from respective perfect sets of ruled-line candidate projections including only the perfect ruled-line candidate projections and the average perfect vector.

5. A ruled-line-projection extracting apparatus that extracts a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the ruled line projections in which ruled lines, which are straight lines forming the three-dimensional paper curved surface, are projected on the image, respectively, by the set of parallel geodesic projections is constant, the ruled-line-projection extracting apparatus comprising:

a first extracting unit that extracts a set of straight lines that associate a top parallel geodesic projection positioned at an upper end with a bottom parallel geodesic projection positioned at a lower end, among the sets of parallel geodesic projections, as a set of ruled-line candidate projections as a search target of a set of ruled line projections;

a calculating unit that calculates a deviation of neighborhood, which is a distance between a vector determined based on an interior division ratio of the ruled-line candidate projection extracted by the first extracting unit and a vector determined based on an interior division ratio of a neighboring line obtained by shifting the ruled-line candidate projection by a predetermined interval, for each of the ruled-line candidate projections;

a storing-and-holding unit that stores and holds the deviation of neighborhood calculated by the calculating unit for each ruled-line candidate projection; and a second extracting unit that extracts a set of straight lines having the smallest sum total of the deviations of neighborhood held by the storing-and-holding unit as a set of ruled line projections, in the sets of straight lines that do not intersect with each other among the sets of ruled-line candidate projections, according to continuous dynamic programming.

6. A method of extracting a set of parallel geodesic projections in which parallel geodesic projections, which are geodesics parallel to each other on a three-dimensional paper curved surface as a ruled surface, are projected on an image obtained by imaging the three-dimensional paper curved surface, from the image, and searching for and extracting a set of ruled line projections by using a condition that an interior division ratio determined based on a ratio of segment lengths obtained by dividing the ruled line projections in which ruled lines, which are straight lines forming the three-dimensional paper curved surface, are projected on the image, respectively, by the set of parallel geodesic projections is constant, the method comprising:

first extracting including extracting a set of straight lines that associate a top parallel geodesic projection positioned at an upper end with a bottom parallel geodesic projection positioned at a lower end, among the sets of parallel geodesic projections, as a set of ruled-line candidate projections as a search target of a set of ruled line projections;

calculating a deviation of neighborhood, which is a distance between a vector determined based on an interior division ratio of the ruled-line candidate projection extracted at the first extracting and a vector determined based on an interior division ratio of a neighboring line obtained by shifting the ruled-line candidate projection by a predetermined interval, for each of the ruled-line candidate projections;

storing and holding the deviation of neighborhood calculated at the calculating for each ruled-line candidate projection; and second extracting including extracting a set of straight lines having the smallest sum total of the deviations of neighborhood held at the storing and holding as a set of ruled line projections, in the sets of straight lines that do not intersect with each other among the sets of ruled-line candidate projections, according to continuous dynamic programming.

* * * * *

UNITED STATES PATENT AND TRADEMARK OFFICE
CERTIFICATE OF CORRECTION

PATENT NO. : 7,903,874 B2  
APPLICATION NO. : 11/894188  
DATED : March 8, 2011  
INVENTOR(S) : Fujimoto et al.

Page 1 of 1

It is certified that error appears in the above-identified patent and that said Letters Patent is hereby corrected as shown below:

On the Title Page:

After "(65) Prior Publication Data" and the publication listed, insert

Item -- (30) Foreign Application Priority Data
Nov. 15, 2006   (JP).... 2006-309426 --

Signed and Sealed this
Twenty-eighth Day of June, 2011

David J. Kappos
*Director of the United States Patent and Trademark Office*